United States Patent
Compagna et al.

(10) Patent No.: US 9,715,592 B2
(45) Date of Patent: Jul. 25, 2017

(54) DYNAMIC ANALYSIS SECURITY TESTING OF MULTI-PARTY WEB APPLICATIONS VIA ATTACK PATTERNS

(71) Applicant: SAP SE, Walldorf (DE)

(72) Inventors: Luca Compagna, La Roquette sur Siagne (FR); Avinash Sudhodanan, Trento (IT); Roberto Carbone, Trento (IT); Alessandro Armando, Genoa (IT)

(73) Assignee: SAP SE, Walldorf (DE)

( * ) Notice: Subject to any disclaimer, the term of this patent is extended or adjusted under 35 U.S.C. 154(b) by 59 days.

(21) Appl. No.: 14/885,001

(22) Filed: Oct. 16, 2015

(65) Prior Publication Data

US 2017/0109534 A1    Apr. 20, 2017

(51) Int. Cl.
*G06F 11/00* (2006.01)
*G06F 12/14* (2006.01)
(Continued)

(52) U.S. Cl.
CPC ........ *G06F 21/577* (2013.01); *H04L 63/1408* (2013.01); *G06F 11/00* (2013.01);
(Continued)

(58) Field of Classification Search
CPC .. G06F 21/577; G06F 2221/033; G06F 11/00; G06F 12/04; G06F 12/16;
(Continued)

(56) References Cited

U.S. PATENT DOCUMENTS

| 7,559,080 B2 | 7/2009 | Bhargavan et al. |
| 7,584,507 B1 * | 9/2009 | Nucci ................. H04L 63/1416 726/22 |

(Continued)

OTHER PUBLICATIONS

Account hijacking by leaking authorization code. Retrieved from http://www.oauthsecurity.com/, printed Sep. 16, 2015.

(Continued)

*Primary Examiner* — Jayesh Jhaveri
(74) *Attorney, Agent, or Firm* — Fountainhead Law Group P.C.

(57) ABSTRACT

A security testing framework leverages attack patterns to generate test cases for evaluating security of Multi-Party Web Applications (MPWAs). Attack patterns comprise structured artifacts capturing key information to execute general-purpose attacker strategies. The patterns recognize commonalities between attacks, e.g., abuse of security-critical parameter(s), and the attacker's strategy relating to protocol patterns associated with those parameters. A testing environment is configured to collect several varieties of HTTP traffic. User interaction with the MPWA while running security protocols, is recorded. An inference module executes the recorded symbolic sessions, tagging elements in the HTTP traffic with labels. This labeled HTTP traffic is referenced to determine particular attack patterns that are to be applied, and corresponding specific attack test cases that are to be executed against the MPWA. Attacks are reported back to the tester for evaluation. Embodiments may be implemented with penetration testing tools, in order to automate execution of complex attacker strategies.

19 Claims, 21 Drawing Sheets

(51) Int. Cl.
   *G06F 12/16* (2006.01)
   *G08B 23/00* (2006.01)
   *G06F 21/57* (2013.01)
   *H04L 29/06* (2006.01)

(52) U.S. Cl.
   CPC ........ *G06F 2221/033* (2013.01); *H04L 63/14* (2013.01); *H04L 63/145* (2013.01); *H04L 63/1416* (2013.01); *H04L 63/1425* (2013.01); *H04L 63/1433* (2013.01); *H04L 63/1441* (2013.01)

(58) Field of Classification Search
   CPC ................. H04L 63/1408; H04L 63/14; H04L 63/1416; H04L 63/1425; H04L 63/1433; H04L 63/1441; H04L 63/145
   See application file for complete search history.

(56) References Cited

U.S. PATENT DOCUMENTS

| | | | | |
|---|---|---|---|---|
| 7,735,116 | B1* | 6/2010 | Gauvin | G06F 21/552 713/153 |
| 8,302,852 | B2 | 11/2012 | Brown | |
| 8,930,772 | B2 | 1/2015 | Sgro et al. | |
| 9,052,941 | B1 | 6/2015 | Bone | |
| 9,083,740 | B1* | 7/2015 | Ma | H04L 63/145 |
| 2006/0224750 | A1* | 10/2006 | Davies | H04L 12/587 709/229 |
| 2007/0169199 | A1 | 7/2007 | Quinnell et al. | |
| 2009/0222924 | A1* | 9/2009 | Droz | H04L 63/1425 726/24 |
| 2011/0283361 | A1* | 11/2011 | Perdisci | G06F 21/56 726/24 |
| 2014/0082735 | A1 | 3/2014 | Beskrovny et al. | |
| 2014/0331274 | A1* | 11/2014 | Bitton | H04L 63/0227 726/1 |
| 2015/0033346 | A1 | 1/2015 | Hebert et al. | |
| 2015/0244733 | A1* | 8/2015 | Mohaisen | H04L 63/1425 726/23 |
| 2015/0264073 | A1* | 9/2015 | Tavakoli | H04L 63/1425 726/23 |
| 2016/0078234 | A1 | 3/2016 | Li et al. | |

OTHER PUBLICATIONS

How will you integrate Sign In with LinkedIn? Retrieved from https://developer.linkedin.com/docs/signin-with-linkedin, printed Sep. 16, 2015.
Instagram API Console. Retrieved from https://apigee.com/console/instagram, printed Sep. 16, 2015.
Integrate Log In with PayPal. Retrieved from https://developer.paypal.com/docs/integration/direct/identity/log-in-with-paypal/, printed Sep. 16, 2015.
Yuchen Zhou and David Evans. SSOScan: Automated testing of web applications for single sign-on vulnerabilities. In Proceedings of the 23rd USENIX Conference on Security Symposium, SEC'14, pp. 495-510, CA, USA, 2014. USENIX Association. Retrieved from https://www.usenix.org/conference/usenixsecurity14/technical-sessions/presentation/zhou.
Internet article: Login to experience INstant. Retrieved from http://instant.linkedinlabs.com/, printed Sep. 16, 2015.
Internet article OAuth 2.0 Playground. Retrieved from https://developers.google.com/oauthplayground/, printed Sep. 16, 2015.
OAuth Security Advisory: 2009.1. Retrieved from http://oauth.net/advisories/2009-1/, Apr. 23, 2009.
Internet article oscommerce official website. Retrieved from http://www.oscommerce.com/oscommerce.com/, printed Sep. 16, 2015.
Internet article PayPal Express Checkout. Retrieved from https://www.paypal.com/webapps/mpp/referral/paypal-express-checkout, printed Sep. 16, 2015.
Internet article: PayPal Payments Standard. Retrieved from https://www.paypal.com/webapps/mpp/paypal-payments-standard, printed Sep. 16, 2015.
Internet article: Selenium WebDriver. Retrieved from http://docs.seleniumhq.org/projects/webdriver/, printed Sep. 16, 2015.
Internet article: Stripe Checkout. Retrieved from https://stripe.com/docs/checkout, printed Sep. 16, 2015.
Internet article: The ZAP Zest Add-on. Retrieved from https://github.com/zaproxy/zap-extensions. printed Sep. 16, 2015.
Internet article: Token Fixation in PayPal. Retrieved from http://homakov.blogspot.it/2014/01/token-fixation-in-paypal.html, printed Sep. 16, 2015.
Internet article: Top Sites in: All Categories > Business > E-Commerce. Retrieved from http://www.alexa.com/topsites/category/Top/Business/E-Commerce, printed Sep. 16, 2015.
Internet article: Top Sites in United States. Retrieved from http://www.alexa.com/topsites/countries/US, printed Sep. 16, 2015.
Devdatta Akhawe, Adam Barth, Peifung E. Lam, John Mitchell, and Dawn Song. Towards a formal foundation of web security. CSF '10, pp. 290-304, Washington, DC, USA, 2010. IEEE Computer Society. Retrieved from http://www.adambarth.com/papers/2010/akhawe-barth-lam-nnitchell-song.pdf, 2010.
A. Armando, R. Carbone, L. Compagna, J. Cuéllar, and L. Tobarra. Formal Analysis of SAML 2.0Web Browser Single Sign-On: Breaking the SAML-based Single Sign-On for Google Apps. In V. Shmatikov, editor, Proc. ACM FMSE, pp. 1-10. ACM Press, 2008. Retrieved from http://www.ai-lab.it/armando/pub/fmse9-armando.pdf, Oct. 17, 2008.
Alessandro Armando, Roberto Carbone, Luca Compagna, Jorge Cuéllar, Giancarlo Pellegrino, and Alessandro Sorniotti. From multiple credentials to browser-based single sign-on: Are we more secure? vol. 354 of IFIP Advances in Information and Communication Technology, pp. 68-79. Springer, 2011. Retrieved from http://www.ai-lab.it/armando/pub/sec2011.pdf, 2011.
Guangdong Bai, Jike Lei, Guozhu Meng, Sai Sathyanarayan Venkatraman, Prateek Saxena, Jun Sun, Yang Liu, and Jin Song Dong. Authscan: Automatic extraction of web authentication protocols from implementations. In Proceedings of the 20th Annual Network and Distributed System Security Symposium (NDSS'13), San Diego, CA, USA, 2013. Retrieved from http://www.internetsociety.org/sites/default/files/04_4_0.pdf, 2013.
C. Bansal, K. Bhargavan, and S. Maffeis. Discovering concrete attacks on website authorization by formal analysis. In Computer Security Foundations Symposium (CSF), 2012 IEEE 25th, pp. 247-262, Jun. 2012. Retrieved from http://www.doc.ic.ac.uk/~maffeis/csf12.pdf.
Internet article: OASIS Consortium. SAML V2.0 Technical Overview. Retrieved from http://wiki.oasis-open.org/security/Saml2TechOverview, Mar. 2008.
Christian Mainka, Vladislav Mladenov, and Jörg Schwenk. Do not trust me: Using malicious idps for analyzing and attacking single sign-on. CoRR, abs/1412.1623, 2014. Retrieved from http://arxiv.org/pdf/1412.1623.pdf, Dec. 4, 2014.
Giancarlo Pellegrino and Davide Balzarotti. Toward black-box detection of logic flaws in web applications. In NDSS Symposium 2014. Internet Society, 2014. Retrieved from http://www.syssec-project.eu/m/page-media/3/ndss14_pellegrino.pdf, Feb. 2014.
Cynthia Phillips and Laura Painton Swiler. A graph-based system for network-vulnerability analysis. In Proceedings of the 1998 Workshop on New Security Paradigms, NSPW '98, pp. 71-79, New York, NY, USA, 1998. Retrieved from http://web2.utc.edu/~djy471/CPSC4660/graph-vulnerability.pdf.
Fangqi Sun, Liang Xu, and Zhendong Su. Detecting logic vulnerabilities in e-commerce applications. In NDSS 2014, California, USA, Feb. 23-26, 2013, 2014. Retrieved from http://web.cs.ucdavis.edu/~su/publications/ndss14.pdf.
Rui Wang, Shuo Chen, and XiaoFeng Wang. Signing me onto your accounts through facebook and google: A traffic-guided security study of commercially deployed single-sign-on web services. In Proceedings of the 2012 IEEE Symposium on Security and Privacy, SP '12, pp. 365-379, Washington, DC, USA, 2012. IEEE Computer Society. Retrieved from http://research.microsoft.com/apps/pubs/default.aspx?id=160659.

(56) References Cited

OTHER PUBLICATIONS

Rui Wang, Yuchen Zhou, Shuo Chen, Shaz Qadeer, David Evans, and Yuri Gurevich. Explicating sdks: Uncovering assumptions underlying secure authentication and authorization. In Proceedings of the 22Nd USENIX Conference on Security, SEC'13, pp. 399-414, Berkeley, CA, USA, 2013. USENIX Association. Retrieved from https://www.usenix.org/conference/usenixsecurity13/technical-sessions/presentation/wang_rui.

YuQing Zhang, QiXu Liu, QiHan Luo, and XiaLi Wang. Xas: Cross-api scripting attacks in social ecosystems. Science China Information Sciences, 58(1):1-14, 2015. Retrieved from http://link.springer.com/article/10.1007%2Fs11432-014-5145-1#page-1. Jan. 2015.

The most common oauth2 vulnerability. http://homakov.blogspot.it/2012/07/saferweb-most-common-oauth2.html. Jul. 2012.

OAuth 2.0 Threat Model and Security Considerations. https://tools.ietf.org/html/rfc6819#section-4.4.2.2, Jan. 2013.

OWASP Zed Attack Proxy Project. http://www.alexa.com/topsites/countries/US. Last modified Oct. 7, 2015.

Akhawe, D., Barth, A., Lam, P. E., Mitchell, J., and Song, D. "Towards a formal foundation of web security." CSF '10, IEEE Computer Society, pp. 290-304. 2010.

Armando, A., Carbone, R., Compagna, L., Cu'E Llar, J., Pellegrino, G., and Sorniotti, A. An authentication flaw in browser-based single sign-on protocols: Impact and remediations. Computers & Security 33 (2013), 41-58. Mar. 2013.

Barth, A., Jackson, C., and Mitchell, J. C. Robust defenses for cross-site request forgery. In Proceedings of the 15th ACM Conference on Computer and Communications Security (New York, NY, USA, Oct. 2008), CCS '08, ACM, pp. 75-88.

Bozic, J., Simos, D. E., and Wotawa, F. Attack pattern-based combinatorial testing. In Proceedings of the 9th International Workshop on Automation of Software Test (New York, NY, USA, 2014), AST 2014, ACM, pp. 1-7. 2014.

Chen, E., Chen, S., Qadeer, S., and Wang, R. Securing multiparty online services via certification of symbolic transactions. In Proceedings of the IEEE Symposium on Security and Privacy (Oakland) (May 2015), IEEE Institute of Electrical and Electronics Engineers.

Somorovsky, J., Mayer, A., Schwenk, J., Kampmann, M., and Jensen, M. On breaking saml: Be whoever you want to be. In Presented as part of the 21st USENIX Security Symposium (USENIX Security 12) (Bellevue, WA, 2012), USENIX, pp. 397-412. 2012.

Wang, R., Chen, S., Wang, X., and Qadeer, S. How to shop for free online—security analysis of cashier-as-a-service based web stores. In Proceedings of the 2011 IEEE Symposium on Security and Privacy (Washington, DC, USA, 2011), SP '11, IEEE Computer Society, pp. 465-480.

Xing, L., Chen, Y., Wang, X., and Chen, S. Integuard: Toward automatic protection of third-party web service integrations. In Network & Distributed System Security Symposium (NDSS) (Feb. 2013).

Ravi Bhoraskar et al, "Brahmastra: Driving Apps to Test the Security of Third-Party Components", USENIX Security Symposium, Aug. 1, 2014, 16 pages.

Michael Gegick, "On the design of more secure software-intensive systems by use of attack patterns", ScienceDirect, Aug. 4, 2006, 17 pages, Raleigh, NC.

Alessandro Armando et al, "From Model-checking to Automated Testing of Security Protocols: Bridging the Gap", Nov. 2011.

Giancarlo Pellegrino, "Toward Black-Box Detection of Logic Flaws in Web Applications", Internet Society, Feb. 23, 2014, 15 pages, San Diego, CA.

Luca Compagna, "Automated Detection and Prevention of Security Vulnerabilities on Multi-party Web Applications", SASSI Workshop 2015, Sep. 15, 2015, 40 pages.

Andrey Petukhov, "Detecting Security Vulnerabilities in Web Applications Using Dynamic Analysis with Penetration Testing", Application Security Conference, May 19, 2008, 16 pages.

\* cited by examiner

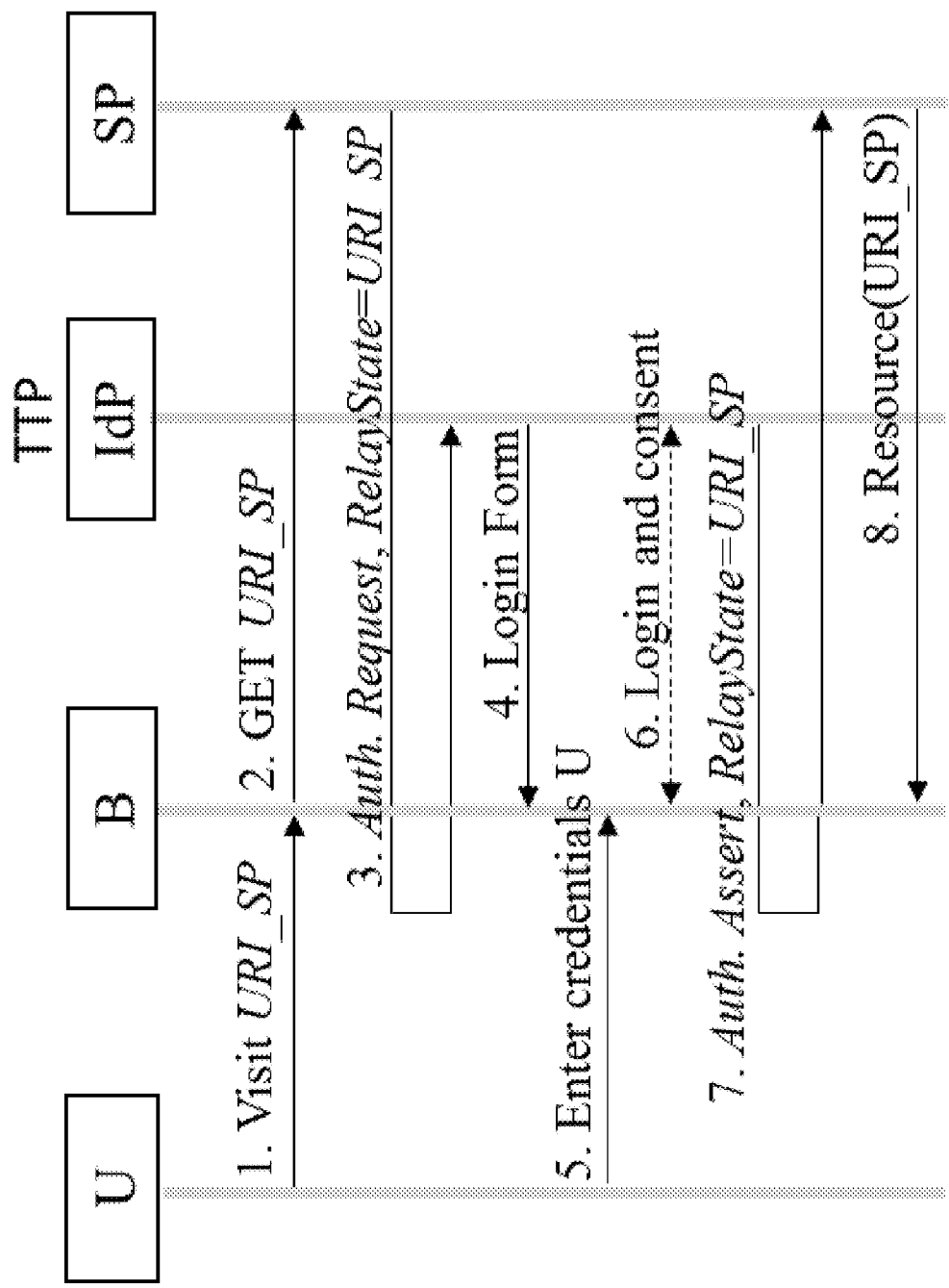

| # | Vulnerable MPWA | Description of the Attack | Attacker's Goal |
|---|---|---|---|
| 1 | SPs implementing Google's SAML SSO [23, §4] | Replay $U_V$'s *AuthAssert* for $SP_M$ in $SP_T$ | Authenticate as $U_V$ at $SP_T$ |
| 2 | SPs implementing OAuth 2.0 implicit flow-based Facebook SSO [38, §5.2.1] | Replay $U_V$ *AccessToken* for $SP_M$ in $SP_T$ | Authenticate as $U_V$ at $SP_T$ |
| 3 | PayPal Payments Standard implementation in SPs using osCommerce 2.3.1 or AbanteCart1.0.4 [31, §IV.A.1] | Replay *PayeeId* of $SP_M$ during transaction $T$ at $SP_T$ | Complete $T$ at $SP_T$ |
| 4 | SPs implementing CaaS solutions of 2Checkout, Chrono-Pay, PSiGate and Luottokunta (v1.2) [34, §VA] | Replay *MerchantId* of $SP_M$ during transaction $T$ at $SP_T$ | Complete $T$ at $SP_T$ |
| 5 | PayPal Express Checkout implementation in SPs using OpenCart 1.5.3.1 or TomatoCart 1.1.7 [31, §IV.A.2] | Replay *Token* of transaction $T_1$ at $SP_T$ during transaction $T_2$ at $SP_T$ | Complete $T_2$ at $SP_T$ |

FIG. 2a

| # | Vulnerable MPWA | Description of the Attack | Attacker's Goal |
|---|---|---|---|
| 6 | SPs implementing OAuth 2.0 implicit flow-based Facebook SSO [36, §4.2] | Replay $AppId$ of $SP_T$ in the session between $U_V$ and $SP_M$ to obtain $AccessToken$ of $U_V$ which is then replayed to $SP_T$. | Authenticate as $U_V$ at $SP_T$ |
| 7 | developer.mozilla.com (SP) implementing BrowserID [24, §6.2] | Make $U_V$ browser send request to $SP_T$ with $U_M$'s $AuthAssert$ | Authenticate as $U_M$ at $SP_T$ |
| 8 | CitySearch.com (SP) using Facebook SSO (OAuth 2.0 Auth. Code Flow) [25, §V.C] | Make $U_V$ browser send request to $SP_T$ with $U_M$'s $AuthCode$ | Authenticate as $U_M$ at $SP_T$ |
| 9 | Github (TTP) implementing OAuth 2.0 Authorization Code flow-based SSO [1, Bug 2] | Replace the value of $RedirectURI$ to MALICIOUSURI in the session between $U_V$ and $SP_M$ to obtain $AuthCode$ of $U_V$ and replay this $AuthCode$ in the session between $U_M$ and $SP_T$ | Authenticate as $U_V$ at $SP_T$ |
| 10 | SPs implementing Facebook SSO [?] | Replace the value of $RedirectURI$ to MALICIOUSURI in the session between $U_V$ and $SP_M$ to obtain $AccessToken$ of $U_V$ and replay this $AccessToken$ in the session between $U_M$ and $SP_T$ | Authenticate as $U_V$ at $SP_T$ |

FIG. 2b

| No. | Session | UAs | Flag |
|---|---|---|---|
| $S_1$ | $(U_V, SP_T)$ | 1. Visit $URI\_SP_T$<br>2. Click Checkout<br>3. Enter credentials $U_V$ | "bought $I_1$" |
| $S_2$ | $(U_M, SP_T)$ | 1. Visit $URI\_SP_T$<br>2. Click Checkout<br>3. Enter credentials $U_M$ | "bought $I_2$" |
| $S_3$ | $(U_V, SP_M)$ | 1. Visit $URI\_SP_M$<br>2. Click Checkout<br>3. Enter credentials $U_V$ | "Enjoy $I_3$" |
| $S_4$ | $(U_M, SP_M)$ | 1. Visit $URI\_SP_M$<br>2. Click Checkout<br>3. Enter credentials $U_M$ | "Enjoy $I_4$" |

FIG. 4b

| Element | Data Flow | SynLabel | SemLabel |
|---|---|---|---|
| *DataKey* | SP-TTP | *BLOB* | *MAND, AU* |
| *Token* | TTP-SP | *BLOB* | *MAND, SU* |

FIG. 4c

```
[ ] HTTP trace
   { } 0
      { } request
         ■ index : 4
         ■ cookies : "SESSID=x1zr.."
         ■ url : "https://SP.com/sso"
         ■ method : "POST"
         ■ headers : "POST /sso.."
         ■ data : "AuthAssert=Ph1hb.."
      { } response
         ■ body : ".."
         ■ url : "https://SP.com/sso"
         ■ headers : "HTTP/1.1 200.."
         ■ statusCode : "200"
      [ ] elements
         { } 0
            ■ name : "AuthAssert"
            ■ value : "Ph1hb.."
            ■ headers : "request.body"
            ■ url : "https://SP.com/sso"
            [ ] synLabels
            [ ] semLabels
            [ ] PPLabels
         { } 1
   { } 1
```

FIG. 7

| Id | Attack Strategy |
|---|---|
| 1 | REPLAY *AuthAssert* FROM $(U_V, SP_M)$ IN $(U_M, SP_T)$ |
| 2 | REPLAY *AccessToken* FROM $(U_V, SP_M)$ IN $(U_M, SP_T)$ |
| 3 | REPLAY *PayeeId* FROM $(U_M, SP_M)$ IN $(U_M, SP_T)$ |
| 4 | REPLAY *MerchantId* FROM $(U_M, SP_M)$ IN $(U_M, SP_T)$ |
| 5 | REPLAY *Token* FROM $(U_M, SP_T)$ IN $(U_M, SP_T)$ |
| 6 | REPLAY *AccessToken* FROM $S$ IN $(U_M, SP_T)$; where $S$ = REPLAY *AppId* FROM $(U_M, SP_T)$ IN $(U_V, SP_M)$ |
| 7 | REPLACE $X$ WITH REQUEST-OF *AuthAssert* FROM $(U_M, SP_T)$ IN $[U_M$ SEND $x]$ |
| 8 | REPLACE $X$ WITH REQUEST-OF *AuthCode* FROM $(U_M, SP_T)$ IN $[U_M$ SEND $x]$ |
| 9 | REPLAY *AuthCode* FROM $S$ IN $(U_M, SP_T)$; where $S$ = REPLACE *RedirectURI* WITH MaliciousURI IN $(U_V, SP_T)$ |
| 10 | REPLAY *AccessToken* FROM $S$ IN $(U_M, SP_T)$; where $S$ = REPLACE *RedirectURI* WITH MaliciousURI IN $(U_V, SP_T)$ |

FIG. 8a

| Name | Attack Strategy | Pre-condition | Post-condition |
|---|---|---|---|
| RA1 | REPLAY $x$ FROM $(U_V, SP_M)$ IN $(U_M, SP_T)$ | (TTP-SP $\in x$.flow AND (SU|UU) $\in x$.labels) | $(U_V, SP_T)$ |
| RA2 | REPLAY $x$ FROM $(U_M, SP_M)$ IN $(U_M, SP_T)$ | (SP-TTP $\in x$.flow AND (SU|AU) $\in x$.labels) | $(U_M, SP_T)$ |
| RA3 | REPLAY $x$ FROM $(U_M, SP_T)$ IN $(U_M, SP_T)$ | (TTP-SP $\in x$.flow AND SU $\in x$.labels) | $(U_M, SP_T)$ |
| RA4 | REPLAY $y$ FROM $S$ IN $(U_M, SP_T)$<br>where $S$ = REPLAY $x$ FROM $(U_M, SP_T)$ IN $(U_V, SP_M)$ | (SP-TTP $\in x$.flow AND (SU|AU) $\in x$.labels AND TTP-SP $\in y$.flow AND (SU|UU) $\in y$.labels) | $(U_V, SP_T)$ |
| LCSRF | REPLACE $req$ WITH REQUEST-OF $y$ FROM $(U_M, SP_T)$ IN $[U_M$ SEND $req]$ | (TTP-SP $\in x$.flow AND (SU|UU) $\in y$.labels) | $(U_M, SP_T)$ |
| RedURI | REPLAY $y$ FROM $S$ IN $(U_M, SP_T)$<br>where $S$ = REPLACE $x$ WITH $x'$ IN $(U_V, SP_T)$; | (SP-TTP $\in x$.flow AND RURI $\in x$.labels) AND TTP-SP $\in y$.flow AND (SU|UU) $\in y$.labels) | $(U_V, SP_T)$ |
| RA5 | REPLAY $x$ FROM $(U_V, SP_T)$ IN $(U_M, SP_T)$ | (TTP-SP $\in x$.flow AND (SU|UU) $\in x$.labels AND $x$.location = REQUESTURL) | $(U_V, SP_T)$ |

FIG. 8b

```
Name: RA1
Threat Model: Web Attacker
Inputs:  UAs($U_V$, $SP_M$),   LHT($U_V$, $SP_M$),                    1
         UAs($U_M$, $SP_T$),   Flag($U_V$, $SP_T$)                    2
Goal: Attacker captures Flag($U_V$, $SP_T$)                           3
Preconditions: At least one element x in LHT($U_V$, $SP_M$) is s.t.   4
(TTP-SP $\in$ x.flow AND (SU|UU) $\in$ x.labels)                      5
Actions:                                                              6
For each x s.t. preconditions hold                                    7
e = extract(x, UAs($U_V$, $SP_M$))                                    8
HTTP_logs = replay(x, e, UAs($U_M$, $SP_T$))                          9
Check Post-Conditions:                                                10
Postconditions: Check Flag($U_V$, $SP_T$) in HTTP_logs                11
Report(e, UAs($U_M$, $SP_T$), Flag($U_V$, $SP_T$))                    12
```

FIG. 9a

```
1  value extract(id x, uas UAs){
2    rb = generate_break_rule(x)
3    load_rule_ZAP(rb)
4    HTTP_logs = execute_ZAP(UAs)
5    e = extract_value(x, HTTP_logs)
6    clear_rules_ZAP
7    return e}
```

FIG. 9b

```
1  HTTP_logs replay(id x, value e, uas UAs){
2    rr = generate_replay_rule(x,e)
3    load_rule_ZAP(rr)
4    HTTP_logs = execute_ZAP(UAs)
5    return HTTP_logs}
```

FIG. 9c

| # | Attack Pattern | SP | TTP (& protocol) | SCP | Class |
|---|---|---|---|---|---|
| a1 | RA3 | AlexaEcommerce-10 | LinkedIn JS API SSO | UId, Email | N |
| a2 | RA5 | Developer.linkedin | LinkedIn JS API SSO | MemberId, AToken | |
| a3 | RA4 | All SPs | Stripe Checkout | DataKey, Token | NS |
| a4 | LCSRF | twitter.com, OpenSAP, other 6 SPs in Alexa Global Top 500 | Gmail | ActLink | |
| a5 | RA1 | AlexaUS-55000 | LinkedIn JS API SSO | Email | |
| a6 | RA1 | INstant | LinkedIn JS API SSO | AccessToken | |
| a7 | XSS | INstant | LinkedIn JS API SSO | Fname, LName | |
| a8 | LCSRF | AlexaGlobal-1000a, AlexaGlobal-1000b | Log In With Instagram | Code | NP |
| a9 | LCSRF | AlexaAu-4200 | LinkedIn OAuth 2.0 SSO | Code | |
| a10 | RedURI | Pinterest | Facebook SSO Auth.Code Flow | RedUri | |
| a11 | RedURI | All SPs | PayPal Log In | RedUri | |
| a12 | RA3 | Sanwebe | PayPal Express Checkout | Token, Payer Id | NA |
| a13 | XSS | AlexaGlobal-300 | LinkedIn REST API SSO | AboutMe | |

FIG. 12

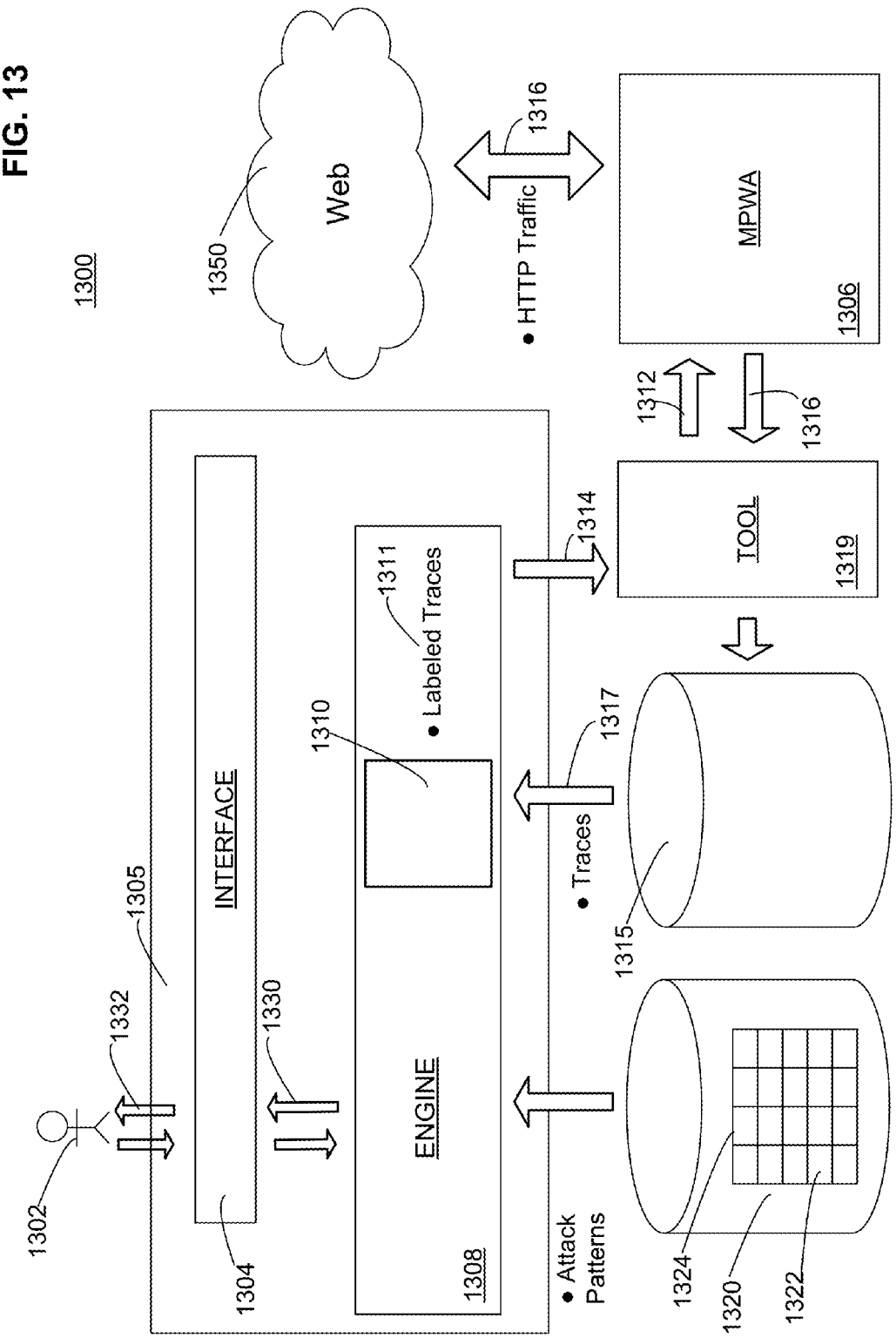

DYNAMIC ANALYSIS SECURITY TESTING OF MULTI-PARTY WEB APPLICATIONS VIA ATTACK PATTERNS

BACKGROUND

Unless otherwise indicated herein, the approaches described in this section are not prior art to the claims in this application and are not admitted to be prior art by inclusion in this section.

Embodiments relate to computer security, and in particular, to dynamic analysis security testing of multi-party web applications via attack patterns.

An increasing number of commercial online applications leverage trusted third parties (TTPs) in conjunction with web-based security protocols to meet their security needs. For instance, many online applications rely on authentication assertions issued by identity providers to authenticate users using a variety of web-based single sign-on (SSO) protocols.

Similarly, on-line shopping applications use online payment services and Cashier-as-a-Service (CaaS) protocols to obtain proof-of-payment before delivering the purchased items. For example, the use of PAYPAL PAYMENT has led to the widespread integration of CaaS APIs by websites implementing online shopping.

This scenario has been further combined with SSO. For instance, the "Log in with Paypal" not only allows users to log in to the Online Shopping websites using their PAYPAL credentials, but it also provides the ability to directly checkout without the need to login to PAYPAL again. This broad class of protocols is herein referred to as security-critical Multi-Party Web Applications (MPWAs).

Three entities may take part in these protocols: the user U (through a web browser B), the web application (playing the role of Service Provider, SP), and a TTP. However, the design and implementation of the protocols used by MPWAs may be subject to errors leading to security vulnerabilities.

For instance, the incorrect handling of the OAuth 2.0 access token by a vulnerable SP can be exploited by an attacker hosting another SP. If the User (the victim) logs into the attacker's SP, the attacker obtains an access token from the victim and can replay it in the vulnerable SP to login as the victim.

SUMMARY

A security testing framework leverages attack patterns to generate test cases for evaluating security of Multi-Party Web Applications (MPWAs). Attack patterns comprise structured artifacts capturing key information to execute general-purpose attacker strategies. The patterns recognize commonalities between attacks, for example abuse of security-critical parameter(s), and the attacker's strategy relating to protocol patterns associated with those parameters. A testing environment is configured to collect several varieties of HTTP traffic with the MPWA. (The terms HTTP traffic, traces, and HTTP traces used herein as synonyms). User interaction with the MPWA while running security protocols, is recorded. An inference module executes the recorded symbolic sessions, tagging elements in the HTTP traffic with labels. This labeled HTTP traffic is referenced to determine particular attack patterns that are to be applied, and corresponding specific attack test cases that are to be executed against the MPWA. Attacks are reported back to the tester for evaluation. Embodiments may be implemented with penetration testing tools, in order to automate execution of complex attacker strategies.

An embodiment of a computer-implemented method comprises an engine executing a user action with a Multi-Party Web Application (MPWA), and the engine receiving a trace of HTTP traffic with the MPWA resulting from the user action. The engine assigns a label to the trace to create a labeled trace, and the engine applies an attack pattern to the labeled trace to identify an attack. The engine reports the attack to a user interface.

A non-transitory computer readable storage medium embodies a computer program for performing a method comprising an engine executing a user action with a Multi-Party Web Application (MPWA). The engine receives a trace of HTTP traffic with the MPWA resulting from the user action, and assigns a plurality of labels to the trace to create a labeled trace. The engine receives an attack pattern comprising a structured artifact, executes the structured artifact against the labeled trace to identify an attack, and reports the attack to a user interface.

An embodiment of a computer system comprises one or more processors, and a software program executable on said computer system. The software program is configured to cause an engine to execute a user action with a Multi-Party Web Application (MPWA), and receive a trace of HTTP traffic with the MPWA resulting from the user action. The software program is further configured to cause the engine to assign a syntactic label, a semantic label, and a flow label to the trace to create a labeled trace. The software program is further configured to cause the engine to receive an attack pattern comprising a structured artifact, to execute the structured artifact against the labeled trace to identify an attack, and to report the attack to a user interface.

In some embodiments assigning the label comprises assigning a semantic label.

In certain embodiments the semantic label identifies an element of the trace as unique to an application, a user, or a session.

According to various embodiments the semantic label identifies the trace as mandatory.

In particular embodiments assigning the label comprises assigning a flow label.

In some embodiments the flow label identifies a generator of the trace and a recipient of the trace.

According to certain embodiments the flow label indicates the generator as a trusted third party (TTP) and the recipient as a service provider (SP), or indicates the generator as the SP and the recipient as a TTP.

In various embodiments the flow label is based upon a location of an element in the trace.

In particular embodiments the attack pattern comprises a structured artifact executable by the engine.

The following detailed description and accompanying drawings provide a better understanding of the nature and advantages of embodiments.

BRIEF DESCRIPTION OF THE DRAWINGS

FIG. 1a shows a SAML-based SSO scenario.
FIGS. 2a-b show attacks against security critical MPWAs.

FIG. 4b shows user actions and flags of STRIPE checkout.

FIG. 4c shows an excerpt of inference on STRIPE checkout.

FIG. 7 shows an excerpt of a HTTP trace augmented with HTTP elements information.

FIG. 8a shows attack strategies against MPWAs investigated in literature.

FIG. 8b shows various attack patterns.

FIG. 9a shows an attack pattern for RA1.

FIG. 9b shows an extract function.

FIG. 9c shows a replay function.

FIG. 12 shows attacks that have been discovered.

FIG. 13 shows a simplified view of a system for dynamic security testing according to an embodiment.

DETAILED DESCRIPTION

Figure 1B:
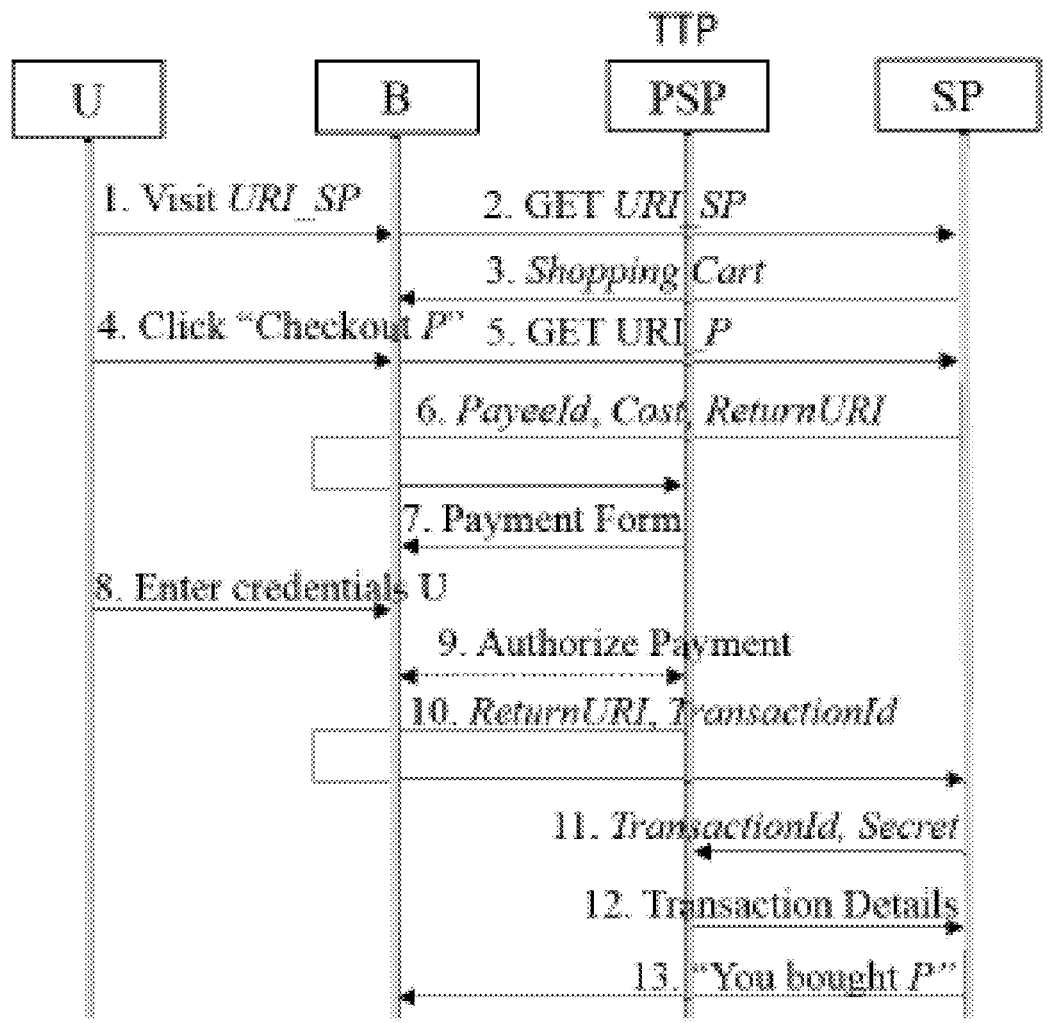
FIG. 1b shows a standard CaaS scenario.

Described herein are methods and apparatuses configured to perform dynamic analysis security testing of multi-party web applications via attack patterns. In the following description, for purposes of explanation, numerous examples and specific details are set forth in order to provide a thorough understanding of the present invention. It will be evident, however, to one skilled in the art that embodiments of the present invention as defined by the claims may include some or all of the features in these examples alone or in combination with other features described below, and may further include modifications and equivalents of the features and concepts described herein.

A security testing framework leverages attack patterns to generate test cases for evaluating security of Multi-Party Web Applications (MPWAs). Attack patterns comprise structured artifacts capturing key information to execute general-purpose attacker strategies. The patterns recognize commonalities between attacks, for example abuse of security-critical parameter(s), and the attacker's strategy relating to protocol patterns associated with those parameters. A testing environment is configured to collect several varieties of HTTP traffic with the MPWA. User interaction with the MPWA while running security protocols, is recorded. An inference module executes the recorded symbolic sessions, tagging elements in the HTTP traffic with labels. This labeled HTTP traffic is referenced to determine particular attack patterns that are to be applied, and corresponding specific attack test cases that are to be executed against the MPWA. Attacks are reported back to the tester for evaluation. Embodiments may be implemented with penetration testing tools, in order to automate execution of complex attacker strategies.

Embodiments pursue an automatic black-box testing technique of security-critical MPWAs. The approach is based on an observation and a conjecture.

The observation is that, regardless of their purpose, the security protocols at the core of MPWAs may share a number of features.

1) By interacting with SP (and/or TTP), U authenticates and/or authorize some action,
2) TTP (SP, resp.) generates a security token,
3) the security token is dispatched to SP (TTP, resp.) through the web browser, and
4) SP (TTP, resp.) checks the security token and completes the protocol by taking some security-critical decision.

The conjecture is that the attacks found in the literature (and possibly others still to be discovered) are instances of a limited number attack patterns. Accordingly a detailed study of attacks discovered in MPWAs of real-world complexity was conducted, and similarities analyzed. This led to identifying a small number of application-independent attack patterns concisely describing actions of attackers while performing these attacks.

FIG. 13 presents a simplified view of a system 1300 according to an embodiment. In particular, user 1302 interacts with an interface 1304 of a security testing framework 1305. That framework is in communication with a Multi-Party Web Application (MPWA) 1306 via an underlying penetration tool 1319.

Specifically, the penetration tool is configured to execute user actions 1312 to communicate with the MPWA. These user actions are collected with the help of the user through the interface. The engine provides instructions 1314 to make the penetration testing tool execute these user actions for purposes of probing the MPWA.

The penetration tool exposes an Application Program Interface (API) that can serve multiple purposes. For example, HTTP requests and responses can be mutated by the engine via API calls that set proxy rules.

Based upon the user actions, the MPWA interacts with various other entities (e.g., TTPs, Service Providers, etc.) through the web 1350 to generate outgoing HTTP traffic and receive incoming HTTP traffic 1316. The penetration tool observes and records in non-transitory computer-readable storage medium 1315, traffic with the MPWA.

Here, the MPWA refers to the web application scenario in which various parties like SP, TTP, user, etc., are involved. The execution of user actions will cause the penetration testing tool open a web browser to communicate with the other entities (TTP, SP, etc.) It is this through this browser that the penetration testing tool collects the required HTTP traffic.

The testing framework further comprises an engine 1308 that is configured to receive these traces. This engine performs certain processing tasks upon the traces in order to provide a security analysis.

In particular, the engine 1308 may comprise an inference module 1310. That module is configured to receive the traces from the MPWA, and to assign syntactic, semantic, and/or data flow labels thereto. Significant further detail regarding the inference labeling is provided in connection with the example described below.

Briefly, however, syntactic labeling can involve matching HTTP elements against simple regular expressions. This can allow preliminary identification of trace content as comprising URL parameters, strings, text, numbers, tokens, and/or other types of expressions.

Semantic labeling performed by the engine may involve active testing of the MPWA to assess various properties of the individual elements involved in the trace. Such properties may reflect uniqueness of the values of these elements, or whether the element is mandatory or optional.

For example, semantic analysis may indicate whether a parameter (trace element value) is unique to a session. This form of uniqueness is indicated where an element of the trace is assigned different values in different sessions.

Semantic analysis may indicate whether a parameter (trace element value) is unique to a user. This is indicted where an element of the trace is assigned the same value in the sessions of the same user.

Semantic analysis may indicate whether a parameter is unique to an application. This is indicted where an element of the trace is assigned the same value in the sessions of a single service provider (SP).

Semantic analysis indicates a trace as being mandatory, where the element must be present in order for the protocol to complete successfully. This can be revealed by having the penetration tool remove the element from the HTTP trace, and then seeing if the interaction (e.g., HTTP traffic) continues or ceases.

Another form of labeling is data flow labeling. Flow labels represent the data flow properties of an element in the HTTP traffic. Two examples of flow labels are: TTP-SP and SP-TTP. Label TTP-SP (SP-TTP, resp.) indicates that the corresponding element has been received from TTP (SP, resp.) and then sent to SP (TTP, resp.). Again, further details of this inference labeling is provided in connection with the example which follows later below.

Based upon labeled traces 1311, the engine is further configured to reference a plurality of attack patterns 1322 that are stored (e.g., in a database 1324) within a non-transitory computer readable storage medium 1320. The attack patterns are developed based upon analysis of extant or foreseen attacks upon MPWAs. The attack patterns capture and express a general-purpose attacker strategy in executable programming logic that is not limited to a particular MPWA architecture.

In certain embodiments, the attack patterns may be stored in a same database that includes the original received traces and/or labeled traces from the MPWA. However, this is not required and in other embodiments the attack patterns may be stored separately from the labeled and/or original trace information.

Based upon the result of this processing of labeled traces according to stored attack pattern(s), the engine is configured to identify an attack 1330, and provide a report 1332 of that attack to the tester (e.g., via the interface).

The report may identify various security protocols and/or parameters affected by the attack. Upon receipt of the report the tester can evaluate those aspects, with an eye toward developing effective countermeasures.

Figure 14:
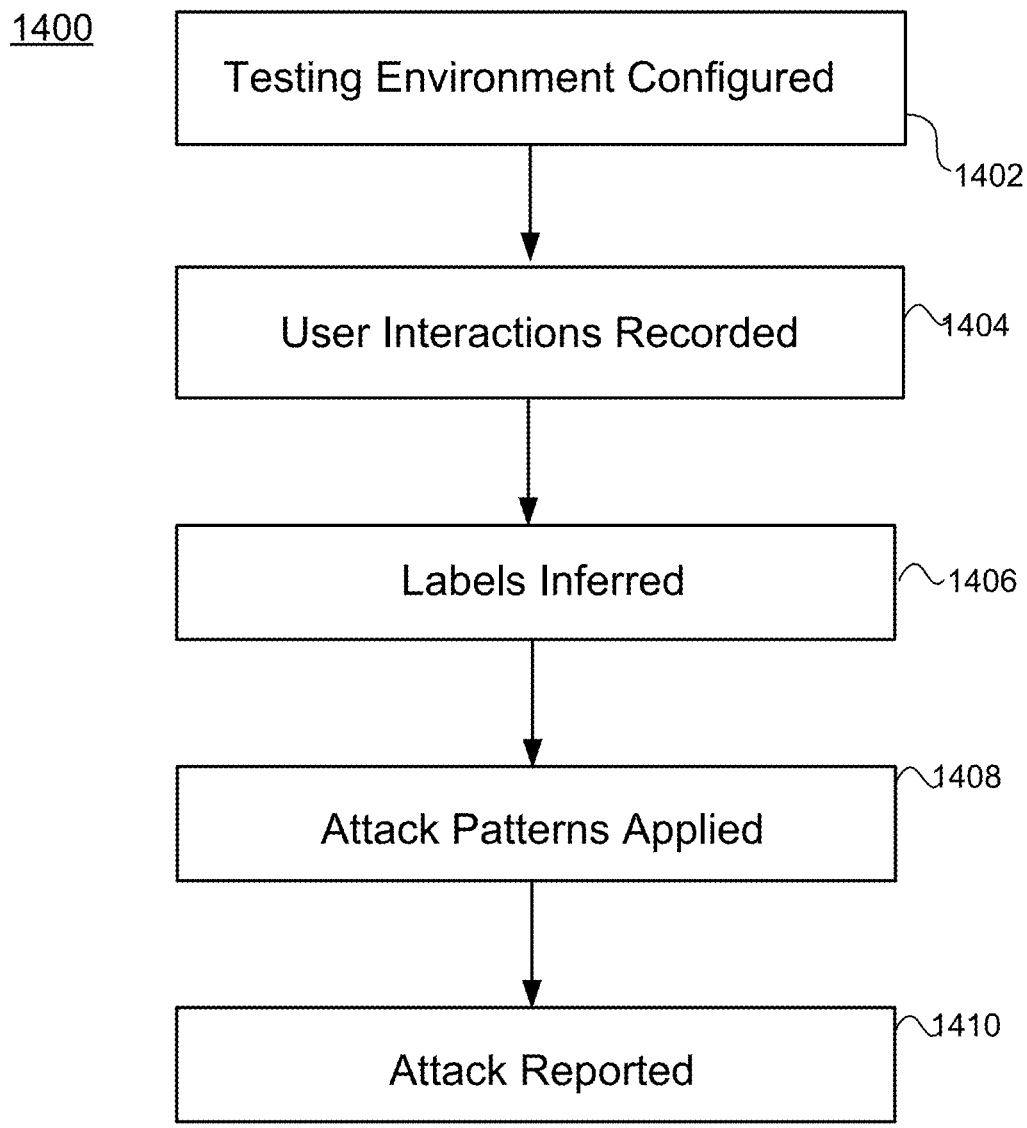
FIG. 14 is a simplified flow diagram showing a process according to an embodiment.

FIG. 14 is a simplified flow diagram showing a method 1400 according to an embodiment. In a first step 1402, an engine of the testing system is configured to collect information relating to the security protocol of a MPWA.

In a second step 1404, the engine records (user) interactions with the MPWA. As mentioned previously, this interaction may result from manual interaction between a tester and the MPWA, and/or from automated probing activity of a penetration tool controlled by the tester.

In a third step 1406, the engine creates labels (e.g., syntactic, semantic, data flow, location) by inference activity. Additional details regarding that inference activity according to an embodiment, are described in detail in connection with the example below.

In a fourth step 1408, the engine applies attack patterns to the labeled HTTP traces. These attack patterns may be stored in an underlying database, for example an in-memory database.

In a fifth step 1410, the engine reports an attack resulting from application of the attack pattern. This reported attack received by the user, may then be the subject of further analysis (e.g., to determine possible patches, structural changes, countermeasures, etc.)

Particular implementations of dynamic security testing according to embodiments, are now presented in connection with the following examples.

EXAMPLES

Figure 1C:
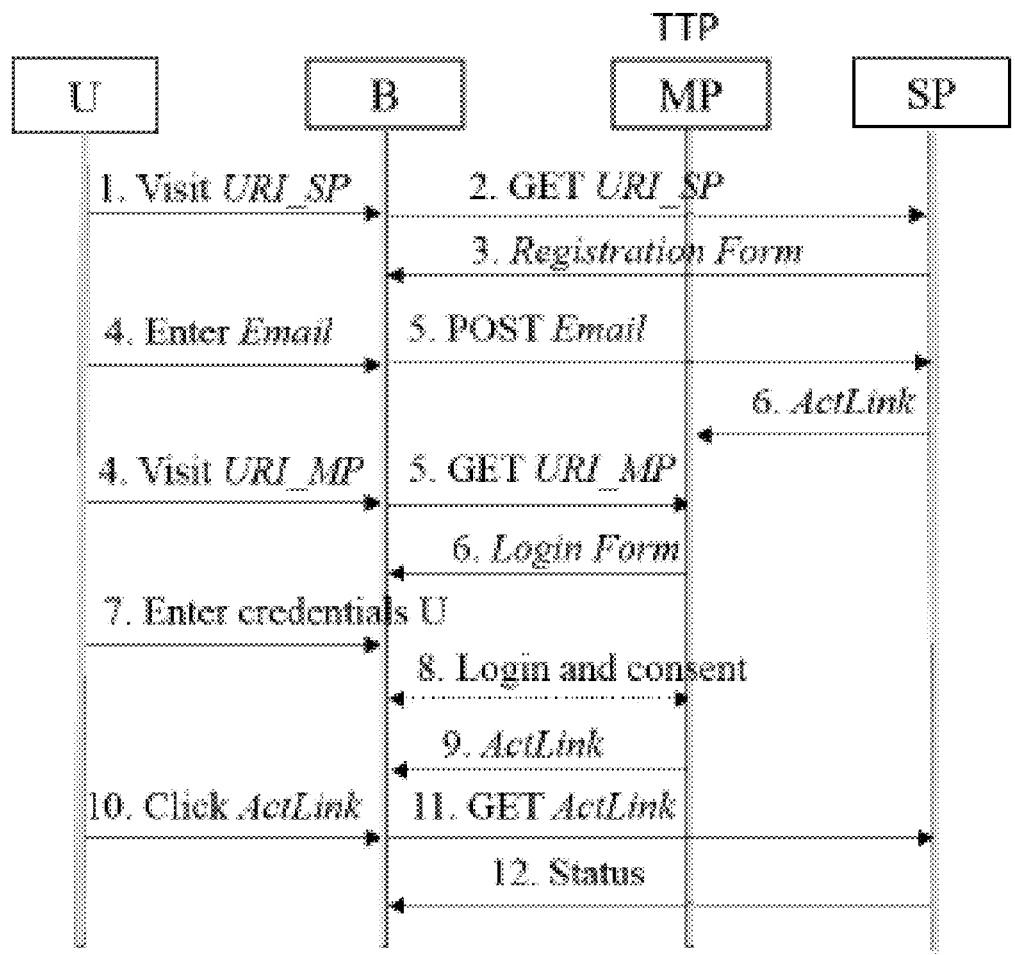
FIG. 1c shows an email notification and acknowledgement scenario.

FIGS. 1a-c provide pictorial representations of example MPWAs leveraging SSO, CaaS, and Verification via Email (VvE) solutions. The MPWA's of FIGS. 1a-c feature (i) a user U, operating a browser B, who wants to consume a service from a service provider SP and (ii) a service provider SP that relies on a trusted-third-party TTP to deliver its services. TLS (and valid certificates at TTP and SP) are used to securely exchange messages.

The following notations are also used:
$U_M$ (attacker playing the role of a malicious user);
$SP_M$ (attacker playing the role of a malicious service provider); and
$SP_T$ (the target service provider which is also the SP under test).

FIG. 1a shows the SAML 2.0 SSO protocol, where SP relies on TTP (the Identity Provider, IdP for short) to authenticate a user U before granting the user access to one of its resources. The protocol starts (steps 1-2) with U asking SP for a resource located at URI_SP. SP in turn redirects B to IdP with the authentication request AuthRequest (step 3). The RelayState field carries the URI_SP of the requested resource. IdP then challenges B to provide valid credentials that are entered by U (steps 4-6). If the authentication succeeds, IdP issues a digitally signed authentication assertion (AuthAssert) and instructs the user to send it (along with the RelayState) to the SP (step 7). SP checks the assertion and delivers the requested resource (step 8).

A severe man-in-the-middle attack against the SAML-based SSO for GOOGLE Apps was reported. The attack, due to a deviation from the standard whereby AuthAssert did not include the identity of SP (for which the assertion was created), allowed a malicious agent hosting a SP (say $SP_M$) to reuse AuthAssert to access the resource of the victim U (say $U_V$) stored at GOOGLE, the target SP (say $SP_T$). More in detail, after a session $S_1$ of the protocol involving $U_V$ and $SP_M$, in which $SP_M$ receives the AuthAssert from $U_V$, the malicious agent starts another session $S_2$ playing the role $U_M$ and mischievously reuses the assertion obtained in $S_1$ in $S_2$ to trick GOOGLE ($SP_T$) into believing he is $U_V$.

FIG. 1b illustrates a typical MPWA running the PAYPAL Payments Standard CaaS protocol where TTP authorizes U to purchase a product P at SP. Here, TTP is a Payment Service Provider (PSP) played by PAYPAL. SP is identified by PAYPAL through a merchant account identifier (PayeeId). U places an order for purchasing P (steps 1-5). SP sends the PayeeId, the cost of the product (Cost) and a return URI (ReturnURI) to TTP by redirecting B (step 6). By interacting with PSP, U authorizes the payment of the amount to SP (steps 7-9). The transaction identifier (TransactionId) is generated by PSP and passed to SP by redirecting B to ReturnURI (step 10). The TransactionId is then submitted by SP to TTP to get the details of the transaction (TransactionDetails) in steps 11-12. Upon successful verification of the TransactionDetails, SP sends U the status of the purchase order (step 13).

A vulnerability in the integration of the PAYPAL Payments Standard protocol in osCommerce 2.3.1 and AbanteCart 1.0.4 that allowed a malicious party to shop for free was discovered. The attack is as follows: from a session $S_1$ of the protocol involving the PSP and the malicious party controlling both a user ($U_M$) and a SP ($SP_M$), the malicious party obtains a payee (merchant) identifier. Later, in the checkout protocol session $S_2$ between $U_M$ and the target SP ($SP_T$), the malicious agent replays the value of PayeeId obtained in the other session and manages to place an order for a product in $SP_T$ by paying herself (instead of $SP_T$).

While MPWAs for SSO and CaaS scenarios received a considerable attention, several other security critical MPWAs may be need of scrutiny. For instance, websites often send security-sensitive URIs to their users via email for verification purposes. This scenario occurs frequently for account registration: an account activation link is sent via email to the user who is asked to access his email and click on the link contained in the email message. An illustration of this scenario is provided in FIG. 1c. Here, TTP is a mailbox provider MP that guarantees SP that a user U is in control of a given email address (Email). During registration, U provides Email to SP (steps 1-5). SP sends the account activation URI (ActLink) via email to U and when U visits his inbox at MP he gets access to ActLink (steps 6-9) and by clicking it, the status of the account activation is loaded in U's browser (steps 10-12). This scenario is not just limited to account activation as the same process is followed by many SPs to verify the authenticity of security-critical operations such as password reset. For generality, this scenario is referred to as Verification via Email (in short, VvE).

Some SPs (e.g. twitter.com) do not properly perceive and/or manage the risk associated to the security-sensitive URIs sent to their users. It turns out that some of these URIs give access to sensitive services skipping any authentication step. For instance, when a user has not signed into twitter for more than 10 days, twitter.com sends emails to the user about the tweets the user missed and this email contains security-sensitive URIs that directly authenticates the user without asking for credentials. Such a URL can be used by an attacker to silently authenticate a victim to an attacker controlled twitter account. This attack is widely known as login CSRF.

FIGS. 2a-2b present ten prominent attacks that were discovered in literature on SSO- and CaaS-based MPWAs. It includes the two attacks mentioned above (excluding login CSRF in twitter), corresponding to the 1st row for SAML SSO, and the 4th row for CaaS. Not considered here are XSS and XML rewriting attacks, see below for detail. Hereafter, we briefly describe the other attacks.

Attack #2: the attacker hosts $SP_M$ to obtain the AccessToken issued by the TTP FACEBOOK for authenticating $U_V$ in $SP_M$. The very same AccessToken is replayed against $SP_T$ to authenticate as $U_V$.

Attack #4: the attacker hosts $SP_M$ to obtain MerchantId from the TTP PAYPAL. This MerchantId is replayed during a transaction T at $SP_T$ and the attacker manages to successfully complete T but the payment of the transaction is credited to $SP_M$.

Attack #5: the attacker completes a transaction $T_1$ at $SP_T$ and the payment Token issued by the TTP PayPal for completing this transaction is reused by the attacker to complete another transaction $T_2$ at $SP_M$ without payment.

Attack #6: the attacker spoofs the AppId of $SP_T$ in the session between $U_V$ and $SP_M$ to obtain AccessToken of $U_V$. The very same AccessToken is then replayed in a session between $SP_T$ and $SP_T$ to authenticate as $U_V$ at $SP_T$. In another example, a logic flaw in flash was applied to capture the AccessToken. However, only the basic strategy of this attack is considered.

Attack #7: initially, the attacker obtains an authentication assertion (AuthAssert) during his session with the $SP_T$. The attacker forces victim's browser to submit AuthAssert to $SP_T$ to silently authenticate $U_V$ as $U_M$ at $SP_T$.

Attack #8: the attacker obtains the value of AuthCode during the session between $U_M$ and $SP_T$. The attacker forces $U_V$'s browser to submit this value to $SP_T$ to silently authenticate $U_V$ as $U_M$ at $SP_T$.

Attack #9: the attacker replaces the value of RedirectURI to a malicious URI (MALICIOUSURI) in the session between $U_V$ and $SP_M$. TTP sends AuthCode of $U_V$ to MALICIOUSURI and the attacker obtains it. The AuthCode is then replayed in the session between $U_M$ and $SP_T$ to authenticate as $U_V$ at $SP_T$.

Attack #10: the attacker replaces the value of RedirectURI to a malicious URI (MALICIOUSURI) in the session between $U_V$ and $SP_M$. TTP sends Access Token of $U_V$ to MALICIOUSURI and the attacker obtains it. The AuthCode is then replayed in the session between $U_M$ and $SP_T$ to authenticate as $U_V$ at $SP_T$.

Various threat models are now discussed. The attacks shown in FIGS. 2a-2b can be discovered by considering the Web Attacker threat model outlined below.

Web Attacker: he/she can control a SP (referred to as the $SP_M$) that is integrated with a TTP. The $SP_M$ can subvert the protocol flow (e.g., by changing the order and value of the HTTP requests/responses generated from her SP, including redirection to arbitrary domains). The web attacker can also operate a browser and communicate with other SPs and TTPs.

Notice also that none of the attacks discussed requires the threat scenario in which the TTP can be played by the attacker. This threat scenario is not considered here.

Inspection of the attacks in FIGS. 2a-2b reveals the following.

1. The attacks leverage a small number of nominal sessions of the MPWA under test, namely those played by $U_V$, $U_M$, $SP_T$, and $SP_M$, concisely represented by ($U_V$, $SP_T$), ($U_M$, $SP_T$), ($U_V$, $SP_M$), ($U_M$, $SP_M$). For the sake of simplicity B and the TTP are left implicit since we identify the browser with the user and the TTP, according to the threat model considered, is assumed to be trustworthy.
2. The attacks amount to combining sessions obtained by tampering with the messages exchanged in one nominal session or by replacing some message from one nominal session into another.

By session it is indicated any sequence of HTTP requests and responses corresponding to an execution of the MPWA under test. A goal is to identify recipes, called attack patterns, that specify how nominal sessions can be tampered with and combined to find attacks on MPWAs. A first phase is identifying and comparing attack strategies for the attacks in FIGS. 2a-2b and then abstracting them into general, i.e. application-independent, attack patterns.

Attack strategies are built on top of the following three operations:

REPLAY x FROM $S_1$ IN $S_2$: indicating that the value of the HTTP element x extracted while executing session $S_1$ is replayed into session $S_2$;

REPLACE x WITH v IN R: denoting that the HTTP element x (e.g. SID) is replaced with the value v (e.g., abcd1234) while executing the sequence of HTTP requests in R; and REQUEST-OF x FROM R: indicating the extraction of the HTTP request transporting the HTTP element x while executing the sequence of HTTP requests in R.

For the sake of simplicity, presented here is the replay of a single element, but attack patterns can support simultaneous replay of multiple elements. By loosening the notation (U, SP) are used in place of R to indicate the sequence of HTTP requests underlying the session (U, SP).

The attack strategies corresponding to the attacks described in FIGS. 2a-2b are given in FIG. 8a.

In attack strategy #1 (and #2) the attacker runs a session with the victim user $U_V$ playing the role of the service provider $SP_M$ and replays AuthAssert (AccessToken, resp.) into a new session with a target service provider $SP_T$. The attacker tries thus to impersonate the victim ($U_V$) at $SP_T$.

Attack strategy #3 (and #4) is analogous to the previous ones, the difference being that the user role in the first session is played by the malicious user and the replayed element is PayeeId (MerchantId, resp.). Here the goal of the attacker is to use credits generated by TTP, in the first session, for $SP_M$ on $SP_T$.

Attack strategy #5 differs from the previous ones in that the User and the SP roles are played by $U_M$ and $SP_T$ respectively in both sessions. In doing so the attacker aims to "gain" something from $SP_T$ by re-using the Token obtained in a previous session with the same $SP_T$.

Attack strategy #6 is the composition of two basic reply attack strategies. The element AppId, obtained by running a session between the victim user $U_V$ and the malicious service provider $SP_M$, is replayed to get the AccessToken which is then in turn replayed by the attacker $U_M$ to authenticate as $U_V$ at $SP_T$. Thus, the result should be the same obtained by completing a session between $U_V$ and $SP_T$.

In attack strategy #7 (and #8) the HTTP request (cf. REQUEST-OF keyword) transporting AuthAssert (AuthCode, resp.) in a session played by $U_M$ on $SP_T$ is replaced on a sequence comprising a single HTTP request in which $U_M$ sends a HTTP request to $SP_T$ (denoted as [$U_M$ SEND req]). Thus, the result should be the same obtained by completing a session between $U_V$ and $SP_T$.

In attack strategy #9 (#10) $U_M$ includes a malicious URI (MALICIOUSURI) in the session between $U_V$ and $SP_T$. In doing so, the credential AuthCode (AccessToken, resp.) is received by $U_M$. By replaying this intercepted AuthCode (AccessToken, resp.) in the session between $U_M$ and $SP_T$, the attacker aims to authenticate as $U_V$ in $SP_T$. Thus, the result should be the same obtained by completing a session between $U_V$ and $SP_T$.

The attack strategies in FIG. 8a are distilled into a small set of general, i.e. application independent, attack patterns which are summarized in FIG. 8b. To illustrate, consider the attack pattern RA1. This pattern has been obtained from attack strategy #1 (#2) in FIG. 8a by abstracting the element to replay, i.e. AuthAssert (AccessToken, resp.) into a parameter x. The generation of all other attack patterns go along the same lines. For the creation of the attack pattern LCSRF we were clearly inspired by attacks #7 and #8. It turns out that this attack pattern is a bit more general than what it was created for. In fact, it can uncover general CSRF based on POST requests. An example of this is discussed later below.

A key step in the execution of an attack pattern is the selection of the elements to be replaced or replayed. For instance, when executing RA1 against a given MPWA, the parameter x can be instantiated with any element occurring in the HTTP trace resulting from the execution of ($U_V$, $SP_M$).

To tackle the problem the sessions are inspected and the elements enriched occurring in the HTTP trace with syntactic, semantic, location and flow labels whose meaning is summarized below.

Syntactic labels provide type information:
URL: a URL, e.g. redirect_uri=http://google.com,
BLOB: an alphanumeric string with (optionally) special characters, e.g. code=vrDK7rE4,
WORD: a string comprised only of alphabetic characters, e.g. response_type=token,
EMAIL: an email address, e.g. usrname=jdoe@example.com,
EMPTY: an empty value, e.g. state=,
NUMBER: a number, e.g. id=5,
BOOL: a boolean value, e.g. new=true, and
UNKNOWN: none of the other syntactic labels match this string, e.g., #target.

Semantic labels provide information on the role played by the element within the MPWA:
SU (Session Unique): the element is assigned different values in different sessions,
UU (User Unique): the element is assigned the same value in the sessions of the same user,
AU (App Unique): the element is assigned the same value in the sessions of a single SP,
MAND (Mandatory): the element must be occur for the protocol to complete successfully; here MAND is not necessarily secret and SU,
RURI (Redirect URI): the element must be MAND, it must be a URL that is passed as a parameter in a request uri and it is later found in the Location header of a redirection response.

Flow labels are assigned to element labeled MAND. Two flow labels may be used: TTP-SP and SP-TTP. Label TTPSP (SP-TTP, resp.) indicates that the corresponding element has been received from TTP (SP, resp.) and then sent to SP (TTP, resp.). Location labels denotes the location in the HTTP Message where the element has been found. The labels used are REQUESTURI, REQUESTHEADER, REQUESTBODY, RESPONSEHEADER and RESPONSEBODY indicating the location of the element as request URI, request header, request body, response header, response body respectively.

The preconditions in FIG. 8b determine how these elements are selected for each pattern. For instance, since RA1 is a replay attack that tries to reply an element from ($U_V$, $SP_M$) to ($U_M$, $SP_T$), it is reasonable to replay only those elements that flow from TTP to SP i.e., data flow label TTP-SP. Indeed, these are the ones that likely comprise specific values that TTP issues for the $U_V$. In addition, it would make little sense to replay elements whose values do not change over different traces. This is why that pattern select only elements in the trace that are tagged either as session unique (SU) or user unique (UU) (the users are different among the sessions where the reply takes place). The precondition of RA2 is analogous to that of RA1, but since RA2 replays an element from ($U_M$, $SP_M$) to ($U_M$, $SP_T$), then that element must flow from SP to TTP. Similar reasoning holds for other attack patterns. For RedURI pattern, only the URLs that are chosen by the $SP_T$ are considered, but can be changed by the users (see the previous definition of RURI label).

FIG. 8b also introduces a new attack pattern named RA5 which is inspired from the "credential leak in browser history" threat model mentioned in the OAuth 2.0 threat model and security considerations document. According to this threat model, $U_M$ and $U_V$ shares the same browser. In the attack strategy, $U_M$ replays (to $SP_T$) the HTTP elements that are issued by the TIP to $SP_T$ for $U_V$. Notice that in the preconditions it is mentioned that the security critical parameters which is used in this attack strategy must be located in the request URL. The request URLs of a session is stored in the browser history.

Last but not least, attack patterns need a way to determine whether the attack strategy they executed was successful to detect any attack. The post-conditions included in FIG. 8b serve this purpose. The idea is that each one of the four nominal sessions is associated with a Flag that defines what determines a successful completion of its nominal session. For instance, a string "Welcome Victim" could be the Flag for the nominal session ($U_V$, $SP_T$) of a MPWA implementing a SSO solution. The concept of Flag will be further clarified in the next section. The post-condition is just a program that checks whether a certain Flag is captured or not while executing the strategy. A value of the form (U, SP) in the column Post-condition stands for this program checking for the Flag associated with (U, SP). It must be noticed that the definition of post-condition depends on the specific application under test.

Figure 3:
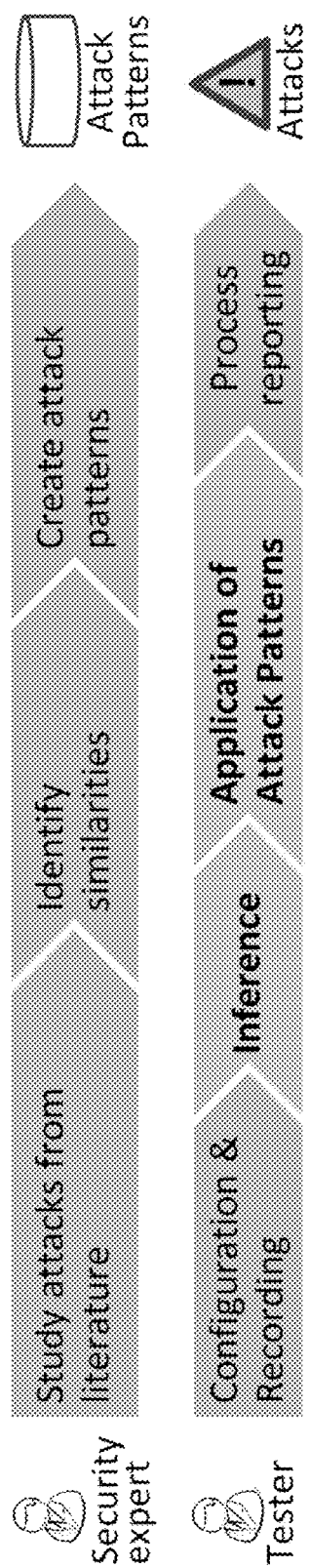
FIG. 3 is a simplified view of an approach to dynamic security testing according to an embodiment.

FIG. 3 outlines the two processes underlying an approach according to embodiments. In the first one, executable attack patterns are created, reviewed, and improved by security experts. The second process allows testers to identify security issues in their MPWAs. In a nutshell, the testers (e.g., developers of a MPWA) take advantage of the security knowledge embedded within the executable attack patterns. What is requested of testers is not much more of what they have to do anyhow in order to test the business logic of their MPWAs.

Creating, reviewing, and improving attack patterns may involve at least two skills: web application security knowledge and implementation skills Security experts, in particular those used to perform penetration testing of web applications, have clearly both. Security experts can thus read and understand attack patterns like those sketched in FIG. 8b. Improving an attack pattern, by changing few things here and there to e.g., make it a bit more general, is also a straightforward follow-up step. Creation of attack patterns asks for some more effort and, more importantly, for inspiration. With the exception of RA5, all attack patterns in FIG. 8b have been inspired by attacks reported in literature. The discovery of a previously unknown attack not yet covered by our catalog of attack patterns is, of course, another source of inspiration. In general, security experts can craft attack patterns capturing novel attack strategies to explore new types of attacks. This is the case for attack pattern RA5, which we developed to explore the "credential leak in browser history" threat model. This threat model, referred to as the browser history attacker, is important because browsers can be shared (e.g., public libraries, internet cafes). To the best of our knowledge we are the first to include this in a black-box security testing approach. A browser history attacker shares the same browser with other Users. It is assumed that the user does not always clear her browser history, but she properly signs out from her login sessions. The attack pattern RA5 leverages this threat model by replaying all elements that the attacker can collect from the browser history of the victim. As seen below, use of this threat model allows detecting two attacks that could not be discovered otherwise.

Figure 4A:
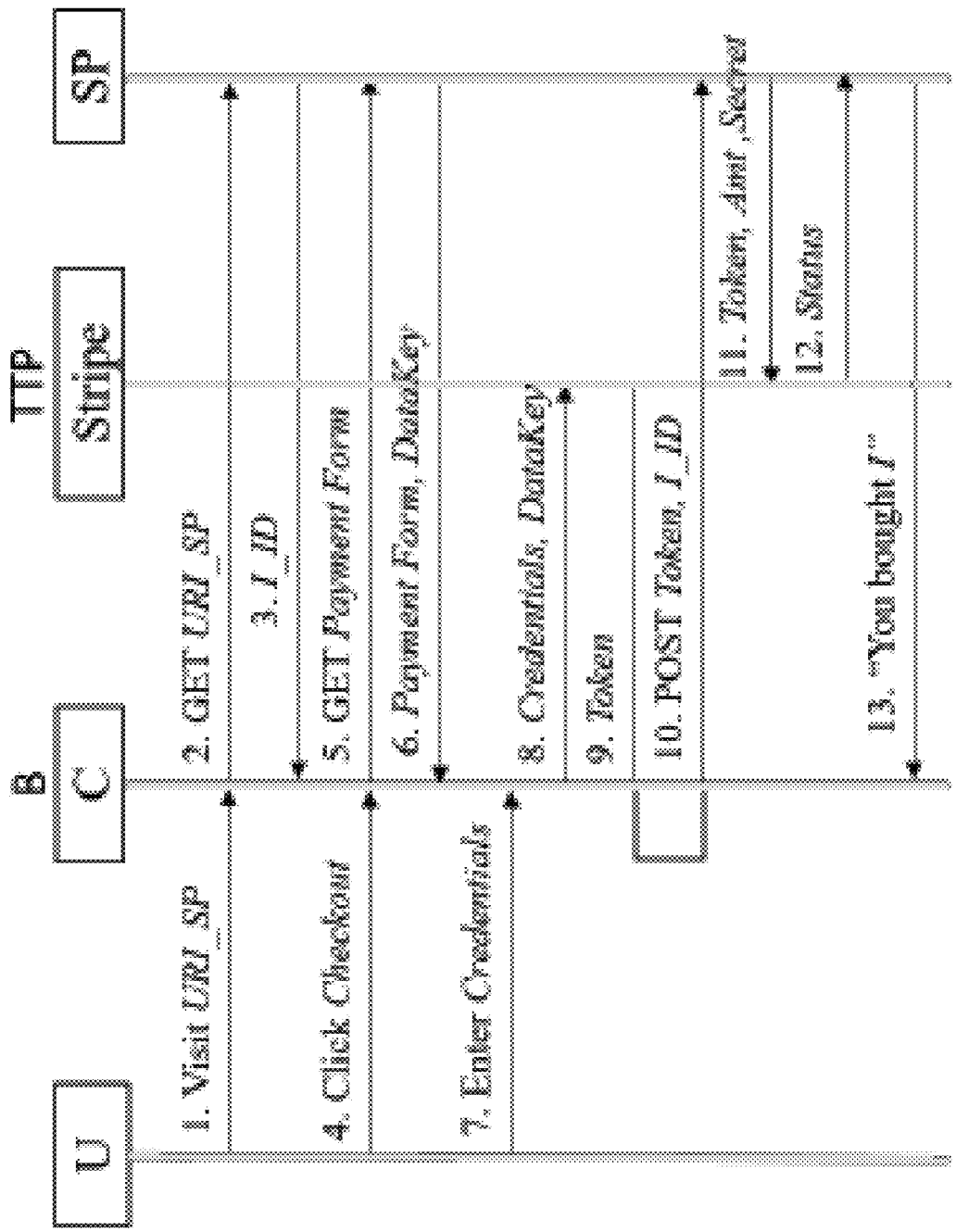
FIG. 4a shows a STRIPE checkout protocol.

Different phases of a security testing framework according to embodiments, are now described. FIGS. 4a-c show how these phases concretely apply on the following illustrative example.

The developer Diana has implemented the STRIPE checkout solution in her web application. She is required to ensure that (r1) the new feature works as it should and (r2) it does not harm the security of her web application. Diana feels confident for (r1) as the STRIPE API is documented and there are several demo implementations available in the Internet that she can use as references. However, she does not for (r2) as she does not have a strong security background.

As shown below, embodiments empower people like Diana (referred to as the tester) to do a systematic usage of the body of knowledge collected by security experts.

A first phase (P1) Configuration, is now described. The tester configures the testing environment so to be able to collect traces for the four nominal sessions: $S_1=(U_V, SP_T)$, $S_2=(U_M, SP_T)$, $S_3=(U_V, SP_M)$, and $S_4=(U_M, SP_M)$. To this end, the Tester creates two user accounts, $U_V$ and $U_M$, in her service provider $SP_T$ and a reference implementation $SP_M$. Notice that, this step does not require any security background and normally does not add-up any additional cost for the tester that wants to functionally test her MPWA. All major TTPs provide reference implementations to foster adoption of their solutions. In case a working official reference implementation is not available, another SP (running the same protocol) can be used.

A second phase (P2) Recording, is now described. In order to allow the testing engine to automatically collect the necessary HTTP traffic, the tester records the user actions (UAs for short) corresponding to sessions $S_1$ to $S_4$. This amounts to collecting the actions $U_V$ and $U_M$ perform on the browser B while running the protocol with $SP_T$ and $SP_M$. Additionally, for each sequence of UAs, the Tester must also identify a Flag, i.e. a regular expression used to determine the successful completion of the user actions. Flags are different between each other so to be able to ensure which session was completed without any ambiguity. Standard Web browser automation technologies like Selenium Web Driver and Zest can be used for recording UAs. Such technology could be extended to allow the tester to define Flags by simply clicking on the web page elements (e.g., the payment confirmation form) that identify the completion of the user actions. Off-the-shelf market tools already implement this kind of feature to determine the completion of the login operation.

A third phase (P3) Inference, is now described. The inference module automatically executes the symbolic sessions recorded in the previous phase and tags the elements in the resulting HTTP traffic with the labels as previously described. More information (e.g., inference of the MPWA observable work-flow) could be used to target more complex attacks. Embodiments combine inferring the syntactic and semantic properties with the concept of inferring flow labels to render embodiments more automatic and efficient.

The inference results of sessions $S_1$ to $S_4$ are stored in a data structure named labeled HTTP trace.

A fourth phase (P4) Application of Attack Patterns, is now described. Labeled HTTP traces (output of inference) are used to determine which attack patterns shall be applied and corresponding attack test cases are executed against the MPWA.

A fifth phase (P5) Reporting, is now described. Attacks (if any) are reported back to the tester and the tester evaluates the reported attacks.

To assess the generality and the effectiveness of embodiments, a security testing framework based on OWASP ZAP (a popular open-source penetration testing tool) has been developed, and run against a number of prominent MPWAs implementations. This tool has been able to identify the following:

- two previously unknown attacks against websites integrating LINKEDIN's Javascript API-based SSO that cause an access token replay attack and a persistent XSS attack;
- a previously unknown redirection URI fixation attack against the implementation of the OAuth 2.0 protocol in PAYPAL's "Log in with PayPal" SSO solution which allows a network attacker to steal the authorization code of the victim and replay it to log in as the victim in any SP website using the same SSO solution;
- a previously unknown attack in the payment checkout solution offered by STRIPE (integrated in over 17 thousand websites); the attack allows an attacker to impersonate a SP to obtain a token from the victim User which is subsequently used to shop at the impersonated SP's online shop using the victim's credit card; and
- seven previously unknown vulnerabilities in a number of websites (e.g., developer.linkedin.com, pinterest.com, websta.me) leveraging the SSO solutions offered by LINKEDIN, FACEBOOK, and INSTAGRAM.

Besides the SSO and the CaaS scenarios, a popular family of MPWAs, namely the Verification Via Email (VvE) scenario, was investigated. This is often used by websites to send security-sensitive information to users via email. By testing the security of Alexa Top 500 websites we found that a number of prominent websites such as dailymotion.com, cnet.com, groupon.com are vulnerable to login CSRF attacks.

The idea that prior attacks proposed on SSO and CaaS share commonalities is not new. However, embodiments provide the first black-box security testing approach that has experimental evidence of applicability in both SSO and CaaS domains.

Prior work on security analysis of MPWAs is focused on SSO and CaaS scenarios. Embodiments evaluate the MPWA scenario in which websites sends security-sensitive information to users via email and show that seven Alexa top 500 websites are vulnerable to login CSRF attack.

Embodiments develop a fully functional prototype of our approach on OWASP ZAP, a widely-used open-source penetration testing tool. The tool is available online at the companion website (https://sites.google.com/site/mpwaprobe/).

Embodiments identify 11 previously unknown vulnerabilities in security-critical MPWAs leveraging the SSO and CaaS protocols of LINKEDIN, FACEBOOK, INSTAGRAM, PAYPAL, and STRIPE.

The example was implemented on top of OWASP ZAP (owasp.org/index.php/OWASP Zed Attack Proxy Project) (ZAP, in short). In this way the two core phases of the testing engine (cf. P3 and P4 above) are fully automated and take advantage ZAP to perform common operations such as execution of UAs, manipulating HTTP traffic using proxy rule, regular expression matching over HTTP traffic, etc.

The STRIPE checkout protocol is illustrated in FIG. 4a. It is slightly different than the PAYPAL Payments Standard presented in FIG. 1b.

The STRIPE protocol of FIG. 4a works as follows. In steps 1-5, the user U visits SP—an e-shopping application—at URI_SP and initiates the checkout of a product item I—the item is identified by I_ID. Upon receiving the checkout request, SP returns a payment form embedded with a unique identifier (DataKey) issued by STRIPE to SP (step 6). The user provides credit card details (Credentials) to STRIPE and DataKey is sent in this request (steps 7-8).

After verifying the validity of Credentials, Stripe returns a token (Token) which is specific to the SP (steps 9-10). Upon presenting Token and Secret (a secret credential possessed by each SP integrating the STRIPE checkout solution) and Amt (cost of I), SP withdraws Amt from the user's credit card (steps 11-12). Finally, the status of the transaction is sent to the user (step 13).

Under the phase (P1) Configuration, Diana uses the SP she implemented as $SP_T$ and the official reference implementations provided by STRIPE as $SP_M$. For each of them, she creates the two user accounts $U_V$ and $U_M$.

Under the phase (P2) Recording, FIG. 4b summarizes the UAs and Flags collected by Diana during the recording phase. Note that the UAs are obtained from steps 1, 4, and 7 of FIG. 4a, while the Flag is derived from step 13 in FIG. 4a. ($I_1$-$I_4$ indicate four different items).

Under the phase (P3) Inference, an excerpt of the inference results of the protocol underlying Diana's implementation of the STRIPE checkout protocol is shown in FIG. 4c.

Under the phase (P4) Application of Attack Patterns, the result of applying each attack pattern of FIG. 8b on this example is reported immediately below. Under the phase (P5) Reporting, the RA5 attack is reported to Diana. Execution details of attack patterns are logged and can be inspected.

Details of the result of applying the attack pattern on STRIPE checkout are now described.

- RA1 REPLAY Token FROM ($U_V$; $SP_M$) IN ($U_M$; $SP_T$). This attack pattern reports no attacks. When the attack test-case reaches Step 10 of FIG. 4a, $U_V$'s Token which was actually issued for $SP_M$ is replayed by $U_M$ against $SP_T$. The TTP STRIPE identifies a mismatch between the owner of Secret and the SP for which Token was issued and returns an error status at Step 12.
- RA2 REPLAY DataKey FROM ($U_M$; $SP_M$) IN ($U_M$; $SP_T$). No attacks reported. Similar reasons as the previous one: the attacker replays DataKey belonging to $SP_M$ in the checkout session at $SP_T$. Hence the Token returned by TTP cannot be used by $SP_T$ to receive a success status at Step 12.
- RA3 REPLAY Token FROM ($U_M$; $SP_T$) IN ($U_M$; $SP_T$). No attack reported. In STRIPE checkout, the validity of a Token expires once it is used. Reuse of Token returns an error.
- RA4 REPLAY DataKey FROM ($U_M$; $SP_T$) IN S where S=REPLAY Token FROM S IN ($U_M$; $SP_T$). This attack pattern reports an attack as there is no protection mechanism in the STRIPE checkout solution that prevents spoofing of the DataKey by another SP. Initially, the attack test case replays the DataKey from ($U_M$; $SP_T$) into ($U_V$; $SP_M$). When the Token obtained in this session by $SP_M$ is replayed into session ($U_M$; $SP_T$), STRIPE does not identify any mismatch and returns a success status at Step 12. This allows the attacker $U_M$ to impersonate $U_V$ and to purchase a product at $SP_T$.
- RA5 This attack strategy is not applicable to STRIPE as there are no elements with data flow TTP-SP that also have REQUESTURL as location (basically none of those elements would be present in the browser history).
- LCSRF REPLACE req WITH REQUEST-OF Token FROM ($U_M$; $SP_T$) IN [$U_M$ SEND req]. This pattern detects an attack. The test case generated sends a HTTP POST request corresponding to Step 10 with an unused Token. This request alone is enough to complete the protocol and to uncover a CSRF. In our experiment this was discovered on the demo implementation of STRIPE. Indeed it is not unusual that this kind of protections are missing in the demo systems. We do not know whether any productive MPWAs suffer from this. Determining this would require specific testing users on the productive system or the buying of real products.

RedURI This pattern is not applicable as there are no URIs that have data flow TTP-SP and semantic property RURI.

Figure 5:
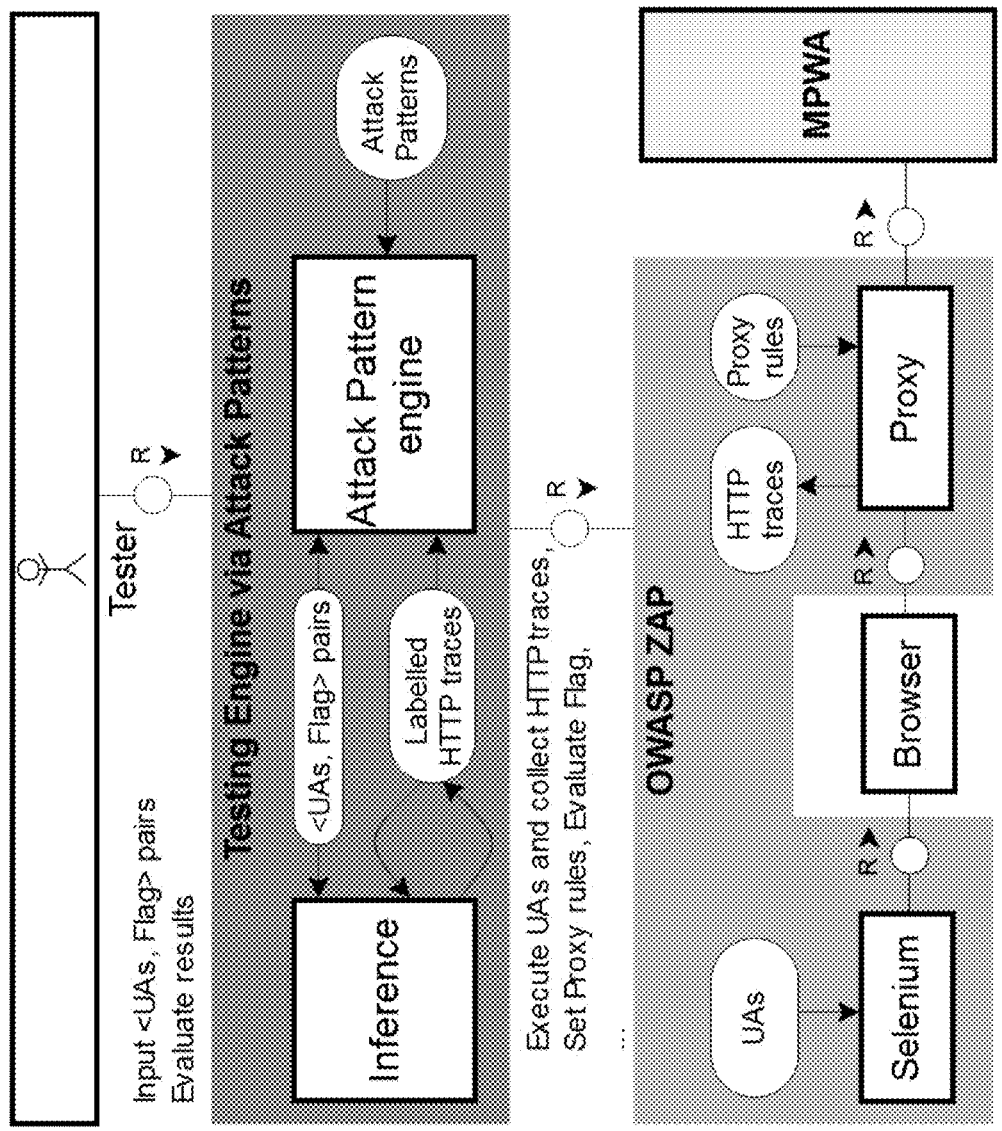
FIG. 5 shows a simplified view of a testing engine architecture.

FIG. 5 outlines a high-level architecture of a testing engine. The Tester provides the necessary input to our Testing Engine that in turn employs OWASP ZAP to probe the MPWA. The "R" with the small arrow is a short notation of the request-response channel pair that clarifies who are the requester and the responder of a generic service. In particular, the Testing Engine invokes the API exposed by ZAP to perform the following operations.

The API is invoked to Execute user actions and collect HTTP traces. UAs, expressed as Zest script, can be executed via the Selenium Web Driver module of ZAP and the corresponding HTTP trace can be collected from ZAP.

The API is set to Proxy rule setting. Proxy rules can be specified, as Zest scripts, to mutate HTTP requests and response passing through the built-in Proxy of ZAP.

The API is invoked to Evaluate Flag. Execute regular expression-based pattern matching within the HTTP trace so to, e.g., evaluate whether the Flag is present in the HTTP trace.

Figure 6A:
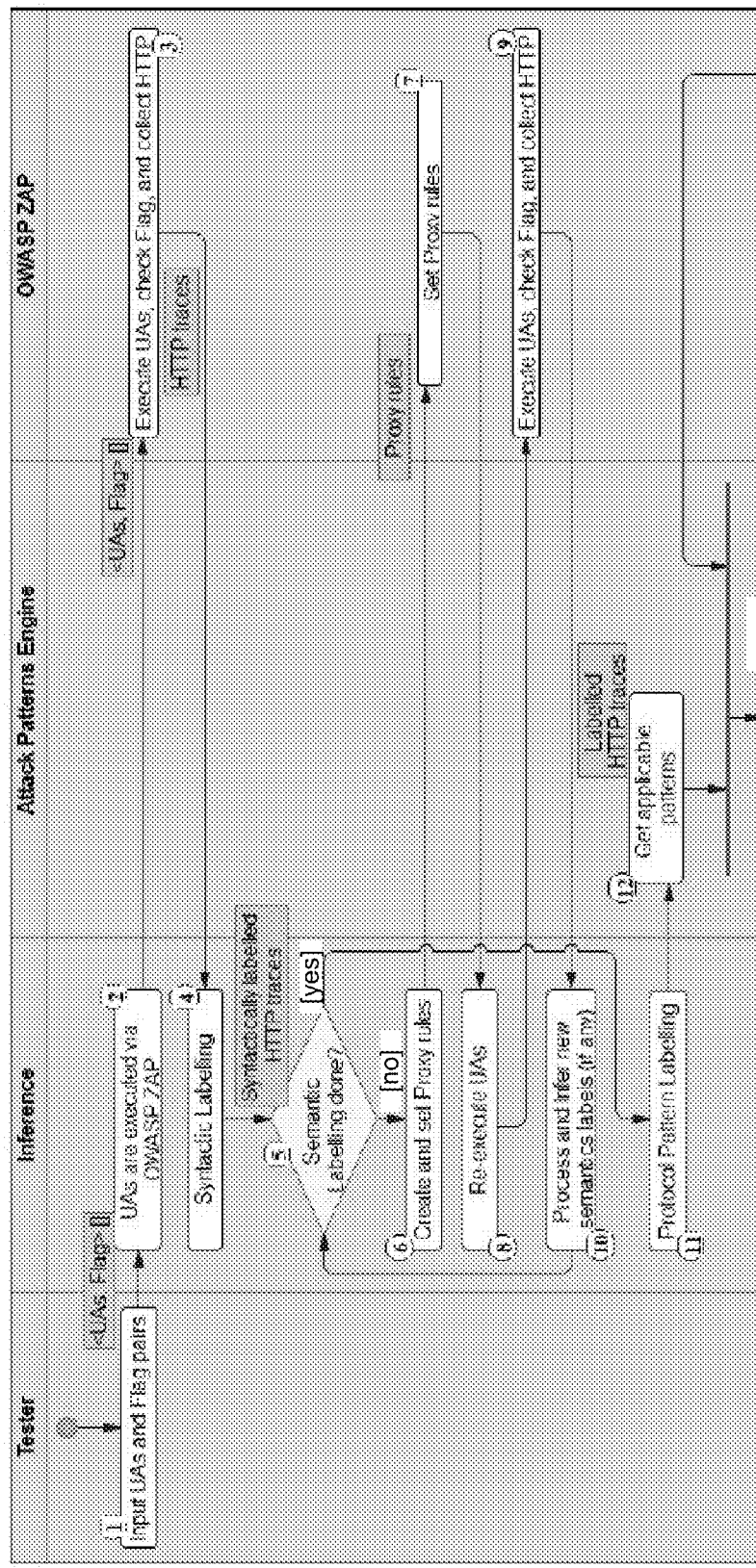
FIGS. 6a-b are simplified diagrams illustrating a testing engine flow.
Figure 6B:
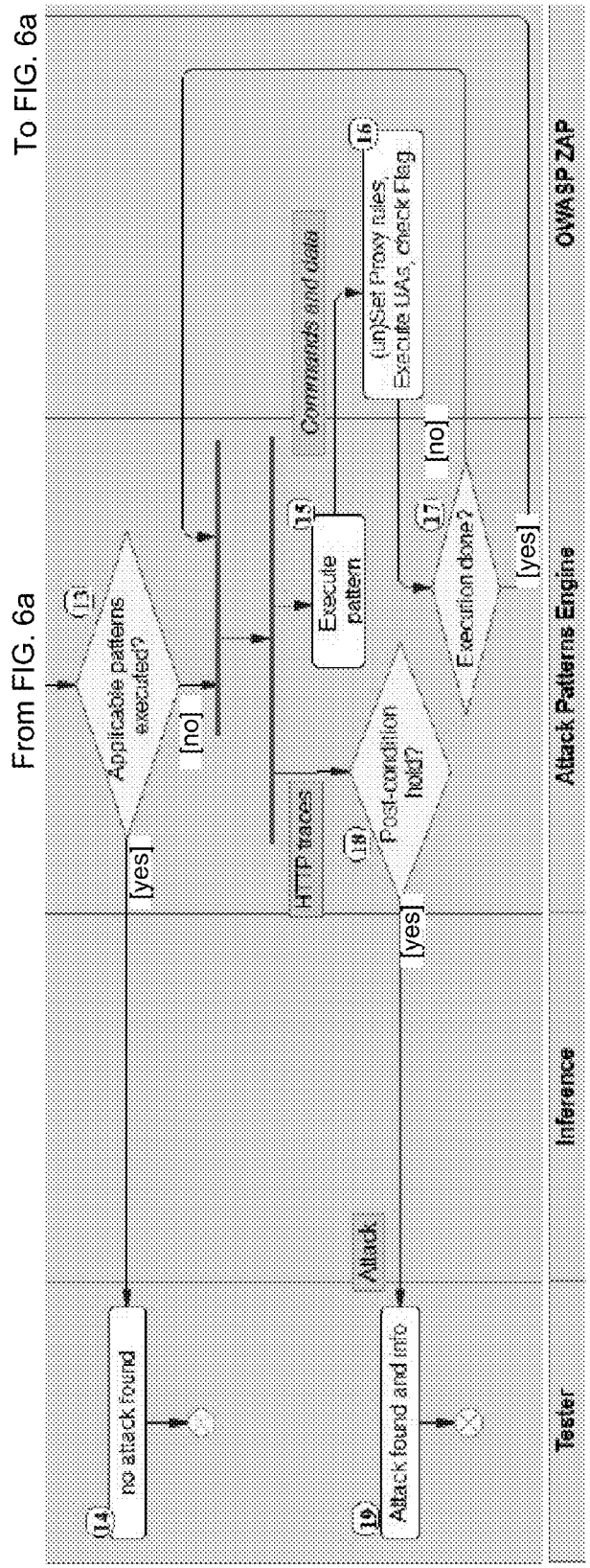

Hereafter are detailed the two core phases (P3 and P4) of the testing engine embodiment that follow the flow depicted in FIGS. 6a and 6b. Each step is tagged by a number to simplify the presentation of the flow.

The role of inference in the process flow is as follows. With reference to the steps of FIGS. 6a and 6b, the following activities are performed by the inference module after the tester records (step 1) the four <UAs, Flag> corresponding to sessions $S_1$, $S_2$, $S_3$, and $S_4$ in (P2).

Trace collection occurs in steps 2-3. The input UAs are executed and corresponding HTTP traces are collected. The Flags are used to verify whether the collected traces are complete. The collected HTTP traces are represented as $HT(S_1)$, $HT(S_2)$, $HT(S_3)$, and $HT(S_4)$.

The traces are stored as an array of <request, response, elements> triplets. Each triplet comprises the HTTP request sent via OWASP ZAP to the MPWA, the corresponding HTTP response, and details about the HTTP elements exchanged. An excerpt of a trace related to the illustrative example of FIG. 4a is depicted in FIG. 7 in JSON format. For simplicity, only one entry of the trace array and only one HTTP element are presented. Here the focus is on the HTTP elements. For each of them we store the name ("name"), the value ("value"), its location in the request/response ("source", e.g., "source"="request.body" indicates that the element occurs in the request body of the HTTP request), the associated request URL ("url"), its data flow patterns, syntactic and semantic labels that are initially empty and will be inferred in the next activities. For instance, the element illustrated in FIG. 7 is the Token shown in Step 10 of FIG. 4a.

Steps 4-10 of FIGS. 6a-b show syntactic and Semantic Labeling. The collected HTTP traces are inspected to infer the syntactic and semantic properties of each HTTP element.

While syntactic labeling is carried out by matching the HTTP elements against simple regular expressions, semantic labeling may require active testing (e.g. for MAND) of the MPWA. For instance, to check whether an element e occurring in $HT(U_M; SP_T)$ is to be given the label MAND, the inference module generates a proxy rule that removes e from the HTTP requests (Step 6). By activating this proxy rule (Step 7), the inference module re-execute the UA corresponding to the session ($U_M$, $SP_T$) and checks whether the corresponding Flag is present in the resulting trace (steps 8-9). For instance, the element Token (see FIG. 7) is assigned the syntactic labels BLOB and the semantic labels SU and MAND.

Data Flow Labeling is shown in step 11. After syntactic and semantic labeling, the data flow properties of each MAND element in the trace is analyzed to identify the data flows (either TTP-SP or SP-TTP). In order to identify the protocol patterns, it is necessary to distinguish TTP and SP from the HTTP trace. This is done by identifying the common domains present in the HTTP trace of the two different SPs ($SP_T$ and $SP_M$) implementing the same protocol and classifying the messages from/to these domains as the messages from/to TTP.

The output of the inference phase is the labeled HTTP traces ($LHT(S_1); LHT(S_2); LHT(S_3); LHT(S_4)$).

The role of the attack patterns engine of FIG. 5 is now described. Each attack pattern has a name, the goal the attacker (who follows the attack strategy defined in the pattern) aims to achieve, the underlying threat model, inputs used, pre-conditions, actions and post-conditions. The inputs to the attack pattern range over the LHTs (labeled HTTP traces generated by the inference module), UAs of the nominal sessions, and the corresponding Flags. The goal, pre-conditions, actions and post-conditions are built on top of the inputs. The pattern is applicable if and only if its pre-conditions hold (steps 12-14 of FIGS. 6a and 6b). As soon as the pattern pre-conditions hold, the actions are executed (steps 15-17 of FIG. 6b). The actions contain the logic for generating proxy rules that mimics the attack strategy. The generated proxy rules are loaded in ZAP and UAs are executed. The execution of UAs generates HTTP requests and responses. The proxy rules manipulates the matching requests and responses. As last step of the actions execution, the post-conditions is checked. If it holds (step 18 of FIG. 6b), an attack report is generated with the configuration that caused the attack (step 19 of FIG. 6b).

An example on Attack Pattern for RA1 is described. To illustrate, let us consider the Replay Attack pattern RA1 reported in FIG. 8b. In FIG. 9a, we show the pseudo-code describing it. The Threat Model considered is the Web Attacker. To evaluate the applicability of the pattern, the output of the inference phase is sufficient ($LHT(U_V, SP_M)$): the attack pattern is executed in case at least one element x has the proper data flow and semantic label (line 6-7). For each selected element x (line 9), the function extract (x, $UAs(U_V, SP_M)$) (line 10) executes $UAs(U_V, SP_M)$, returning the value e associated with x. This value e is then used by the function replay (x, e, $UAs(U_M, SP_T)$) (line 11) to replay the value of e while executing UAs(UM; SPT), and generating the corresponding HTTP_logs. The logs are finally used in the Postconditions to check whether $Flag(U_V; SP_T)$ occurs. To clarify how the attack patterns engine leverages the API exposed by ZAP to interact with the built-in Proxy, the pseudo-codes corresponding to the extract and replay functions are reported in FIG. 9b and FIG. 9c, respectively. In FIG. 9b, at first, the function generate_break_rule (x) is invoked. Given an element x, it returns a proxy rule rb breaking the execution of ZAP, when an occurrence of x is detected. The proxy rules include regular expressions used to identify the elements in the HTTP traffic. Then, the ZAP API load_rule_ZAP(rule) loads rb in ZAP. The ZAP API execute_ZAP(UAs) executes the UAs in ZAP and returns the generated HTTP_logs. The HTTP_logs are taken as input by the function extract_value (x, HTTP_logs) extracting from them the value e, associated to x. In FIG. 9c, the function generate_replay_rule (x, e) returns the proxy rule rr used to detect and replace the value of the element x with e. Then, the ZAP API load_rule_ZAP(rule) loads rr in ZAP. The ZAP API execute_ZAP(UAs) executes the UAs in ZAP and returns the generated HTTP_logs.

Notice that, besides the functions mentioned above, in order to help the security expert in defining new attack patterns, we provide several functions. The full list of functions that can be used in the definition of attack patterns is available at https://sites.google.com/site/mpwaprobe.

To test the effectiveness of our approach, the prototype implementation was run against a large number of real-world MPWAs. The criteria used to select our target MPWAs is now described.

We selected SSO, CaaS and VvE (see FIG. 1c) scenarios as the targets of our experiments. For the SSO scenario, we adopted a strategy to identify SPs integrating SSO solutions offered by LINKEDIN, INSTAGRAM, PAYPAL, and FACEBOOK. Additionally, we prioritized the results using the Alexa rank of SPs. For the CaaS scenario, we targeted publicly available demo SPs integrating PAYPAL Express Checkout and STRIPE checkout solutions. For the VvE scenario, we selected the websites belonging to the Alexa Global Top 500 category.

We have been able to identify several previously unknown vulnerabilities. The new attacks are reported in FIG. 12. We have promptly notified our findings to the flawed SPs and TTPs and most of them acknowledged our reports and promptly patched their solutions. As some SPs have not yet patched the vulnerabilities, FIG. 12 anonymizes the names of those SPs.

We cluster the attacks in four classes (see last column of FIG. 12) according to their similarities with respect to known attacks. This allows us to show the capabilities of our approach not only to detect attacks already known in literature, but also to find similar attacks in MPWAs implementing different protocols and in different MPWA scenarios.

Attack class N represents a new kind of attack. The RA5 pattern that leverages the browser history attacker threat model discovered an attack in the integration of the LINKEDIN JS API SSO solution at developer.linkedin.com (#a2). The presence of the nonexpiring user id of the victim in the browser history allows an attacker to hijack the victim's account. Another SP website that appears in the Alexa top 10 e-commerce website category is also vulnerable to the same attack (#a1).

Attack class NS represents a known kind of attack has been applied to a different MPWA scenario. By applying the RA4 attack pattern, we were able to detect a previously unknown attack in the CaaS scenario (#a3 of FIG. 12). It must be noted that RA4 is inspired by an attack in SSO scenario (see #6 of FIG. 2b), and our protocol-independent approach allowed us to detect it in a different scenario. In particular, we identified the attack in the payment checkout solution offered by STRIPE: the attack allows an attacker to impersonate a SP (by replaying its publicly available API key) to obtain a token from the victim user which is subsequently used to shop at the impersonated SP's online shop using the victim's credit card. As reported in FIG. 12, this attack is applicable to all SPs implementing the STRIPE checkout solution. Similarly, using our login CSRF attack pattern, we tested the VvE scenario and discovered the following (#a4):

1) login CSRF attack in the account registration process of OpenSAP and seven other SPs (all having Alexa Global rank less than 500). One of the victim SP is a popular video-sharing website. The account activation link (ActLink of FIG. 1c) issued by this website not only activated the account, but also authenticated the user without asking for credentials. An attacker can create a fake account that looks similar to the victim's account and authenticate the victim to the fake account. This enables the attacker to keep track of the videos searched by the victim and use this information to embarrass the victim.

2) twitter.com sends an email to a user if he/she has not signed into twitter for more than 10 days. The URLs included in this email directly authenticates the user without asking for credentials. This is a potential launchpad for performing login CSRF attacks. A totally different login CSRF attack against twitter.com was previously discovered and it was demonstrated how a login CSRF attack in twitter.com becomes a login CSRF vulnerability on all of its client websites.

Attack class NP represents a known kind of attack is applied to different protocols or implementations of the same scenario (SSO, CaaS, or VvE). Using the RA1 attack pattern which is inspired by the attacks against GOOGLE's SAML SSO (cf. #1 of FIG. 2a) and FACEBOOK's OAuth SSO (cf. #2 of FIG. 2a), we discovered a similar issue in the integration of the LinkedIn JS API SSO solution at INstant (#a6) and another SP (#a5) which has an Alexa US Rank (http://www.alexa.com/topsites/countries/US) less than 55,000. The vulnerable SPs authenticated the users based on their email address registered at LINKEDIN and not based on their SP-specific user id.

We discovered login CSRF attacks in two SPs (#a8, both having Alexa Global Rank less than 1000) integrating the Instagram SSO solution and another SP (#a9 of FIG. 12, with Alexa Australia rank (http://www.alexa.com/topsites/countries/AU) less than 4200) integrating the LinkedIn OAuth 2.0 SSO. The attack pattern that discovered these attacks is inspired from the login CSRF attacks against SPs integrating the Browser Id SSO and Facebook SSO solutions (see #7 and #8 of FIG. 2b).

Our attack pattern that tampers the redirect URI (inspired from #9 of FIG. 2b) reported that in Pinterest's implementation of the Facebook SSO, it is possible to leak the OAuth 2.0 authorization code of the victim to the network attacker by changing the protocol of the redirect URI from "https" to "http" (#a10 of FIG. 12). This was due to the presence of an unprotected Pinterest authentication server. The same vulnerability was found in all SPs implementing the "Login with PayPal" SSO solution (#a11 of FIG. 12). However, in this case it was due to incorrect validation of the redirect URI by the IdP PayPal.

Attack class NA represents a known kind of attack on a specific protocol is applied to new SPs (still using the same protocol offered by the same TTP). This shows how our technique can cover the kinds of attacks that were reported in literature. For instance, we tested a publicly available demo shopping cart application (integrating PAYPAL Express Checkout) provided by sanwebe.com and noticed that the RA3 attack pattern reported an attack (#a12 of FIG. 12) similar to cf. #5 of FIG. 2a.

We were also able to manually identify two attacks. We created one single attack pattern that generalizes an XSS attack strategy. While writing the preconditions and the attacker strategy was straightforward, the post-condition was more challenging. Indeed establishing whether a XSS payload is successfully executed is a known issue in the automatic security testing community. In our preliminary experiments, we just relied on the tester to inspect the results of the pattern and to determine whether the XSS payload was successfully executed. By doing so we uncovered an XSS vulnerability in the INstant website integrating the LinkedIn JS API SSO. Additionally, we manually analyzed the data flow between SP and TTP in SPs integrating LinkedIn REST API SSO to identify tainted data elements. We replaced the value of tainted elements with XSS payloads and identified another XSS vulnerability in a SP that has Alexa Global rank less than 300 (#a13).

In general, coverage is a general issue for the black-box security community. Though each of our attack patterns can state precisely what it is testing, our approach is not an exception in this respect. For instance, it can only detect known types of attacks because our attack patterns are inspired from known attacks. Creative security experts could craft attack patterns capturing novel attack strategies to explore new types of attacks. Two cases can be foreseen here. The new attack patterns (new recipes) can be built (cooked) on top of the available preconditions, actions, and post-conditions (ingredients). In this case it should be pretty straightforward for security experts to cook this new recipe. If new ingredients are necessary, extensions are needed. These can range from adding a simple operation on top of OWASP ZAP up to extending the inference module with e.g., control-flow related inferences and similar. Another research direction could focus on integrating fuzzing capabilities within some of our attack patterns. A clear drawback is that this extension will likely make the entire approach subject to false positives. A more challenging research direction could focus on automated generation of attack patterns. Though this may look as a Holy Grail quest, there may be reasonable paths to explore. For instance, when considering replay attacks and the patterns we created for them, it is clear that the attack search space we are covering is far from being complete. How many sessions and which sessions should be considered in the replay attack strategy as well as which goal that strategy should target remain open questions. However attack patterns could be automatically generated to explore this combinatorial search space.

A few attacks reported in the MPWA literature are not covered by our attack patterns. In fact, FIGS. 2a and 2b do present neither XML rewriting attacks nor XSS attacks. For XSS we did not invest too much in that direction as there are already specialized techniques in literature that are both protocol- and domain-agnostic. By adding XML support, new attack patterns can be created to target also XML rewriting attacks. This can be a straightforward extension of our approach and prototype especially considering that OWASP ZAP supports Jython. Basically, all Java libraries can be run within OWASP ZAP so that Java functions performing transformations on the HTTP traffic (e.g., base64, XML parsing). Our approach can also be extended to handle postMessage: frames would be considered as protocol entities and their interactions as communication events. While there are no conceptual issues to perform this extension, there is technical obstacle as, at the moment, OWASP ZAP provides only partial support to intercept postMessages.

Embodiments call for the tester to provide the initial configurations. The quality of these configurations has a direct impact on the results. For instance if the Flags are not chosen properly, our system may report false positives.

In conclusion, embodiments present an approach for black-box security testing MPWAs. The core of our approach is the concept of application-agnostic attack patterns. These attack patterns are inspired from the similarities in the attack strategies of the previously discovered attacks against MPWAs. The implementation of our approach is based on OWASP ZAP, a widely-used open-source legacy penetration testing tool. By using our approach, we have been able to identify serious drawbacks in the SSO and CaaS solutions offered by LINKEDIN, PAYPAL, and STRIPE, previously unknown vulnerabilities in a number of websites leveraging the SSO solutions offered by FACEBOOK and INSTAGRAM and automatically generate test cases that reproduce previously known attacks against vulnerable integration of the PAYPAL Express Checkout service.

Figure 10:
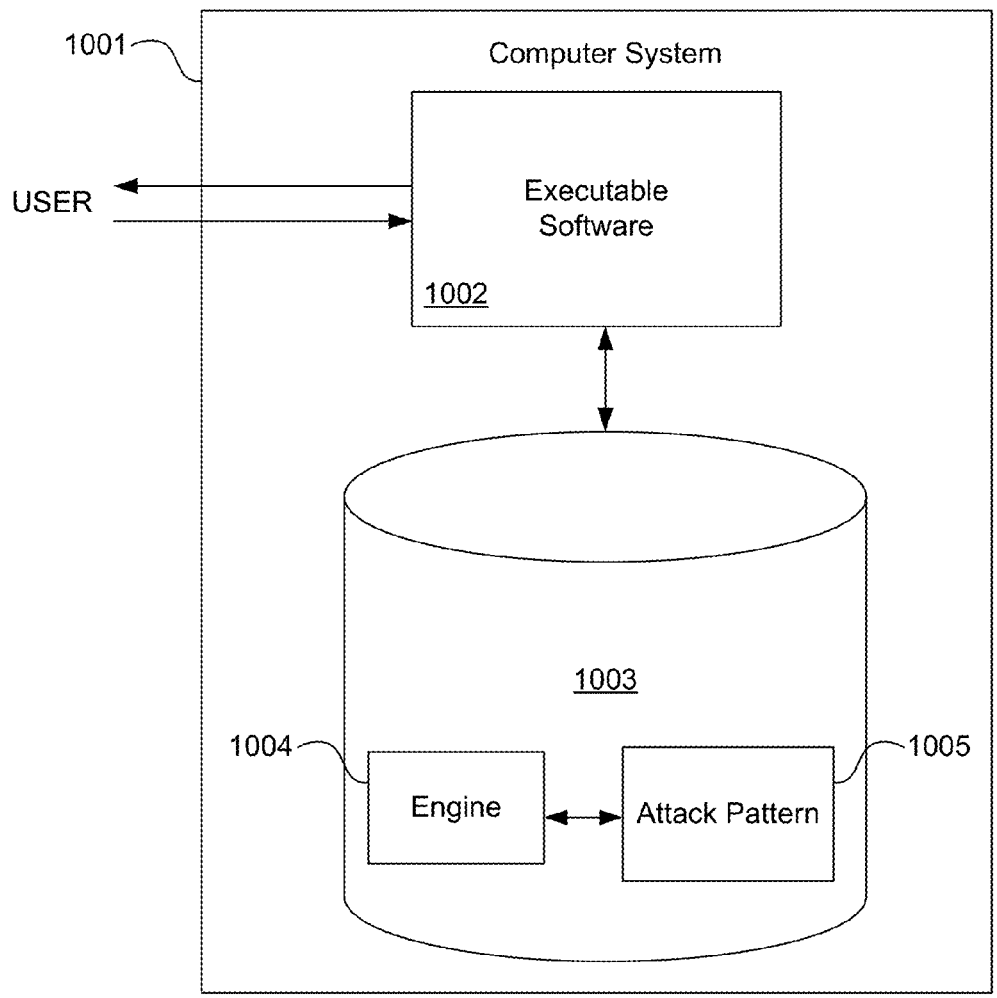
FIG. 10 illustrates hardware of a special purpose computing machine configured to perform security testing according to an embodiment.

FIG. 10 illustrates hardware of a special purpose computing machine configured to perform security testing according to an embodiment. In particular, computer system 1001 comprises a processor 1002 that is in electronic communication with a non-transitory computer-readable storage medium 1003. This computer-readable storage medium has stored thereon code 1005 corresponding to an attack pattern. Code 1004 corresponds to an engine. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

It is noted that in the specific embodiment of FIG. 10, the engine is shown as being part of a database. Such an embodiment can correspond to applications performing processing by a powerful engine available as part of an in-memory database (e.g., the HANA in-memory database available from SAP SE of Walldorf, Germany). However, this not required and in certain embodiments (e.g., that shown in FIG. 13) the engine may be implemented in other ways, for example as part of an overlying application layer.

Figure 11:
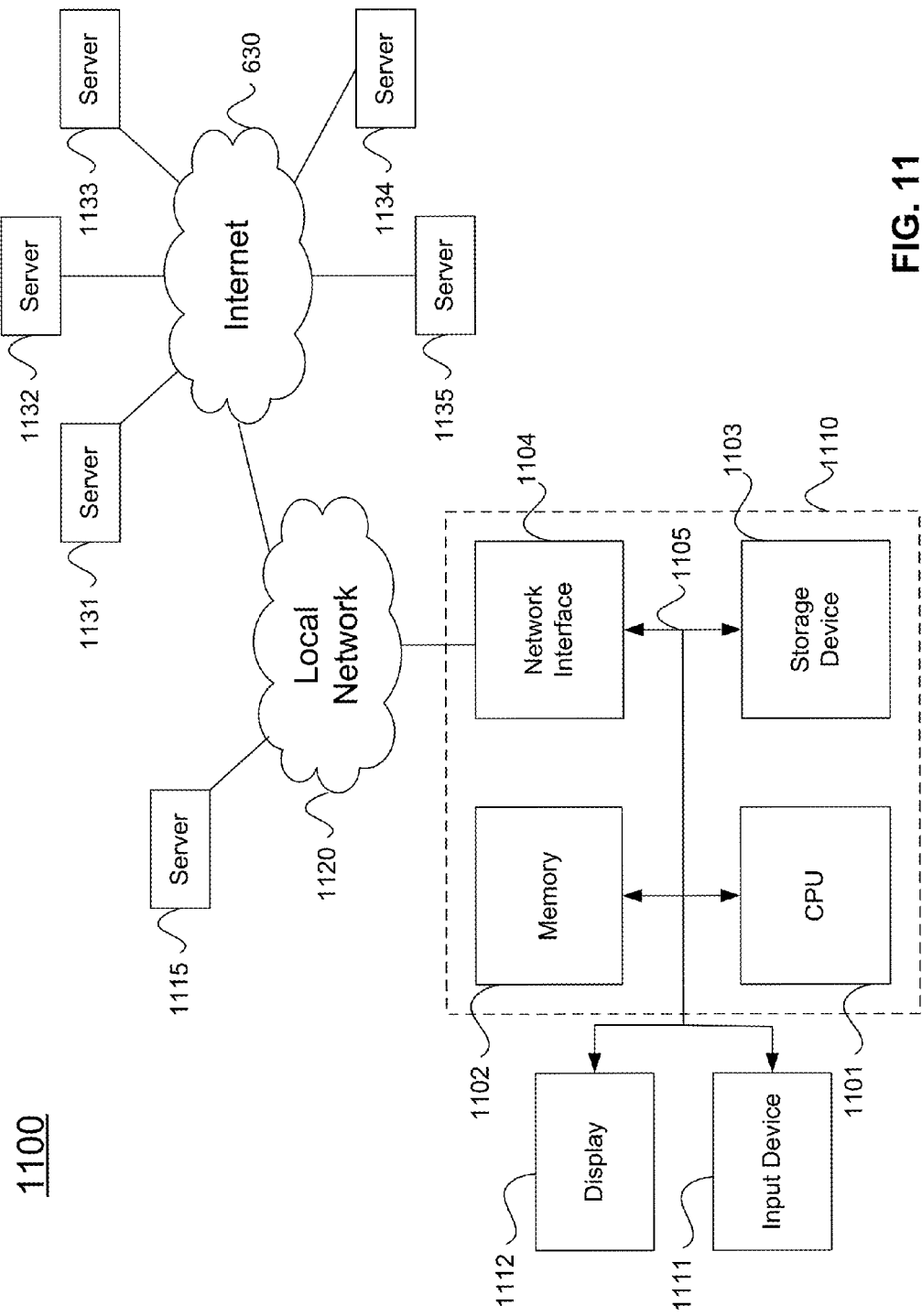
FIG. 11 illustrates an example computer system.

An example computer system 1100 is illustrated in FIG. 11. Computer system 1110 includes a bus 1105 or other communication mechanism for communicating information, and a processor 1101 coupled with bus 1105 for processing information. Computer system 1110 also includes a memory 1102 coupled to bus 1105 for storing information and instructions to be executed by processor 1101, including information and instructions for performing the techniques described above, for example. This memory may also be used for storing variables or other intermediate information during execution of instructions to be executed by processor 1101. Possible implementations of this memory may be, but are not limited to, random access memory (RAM), read only memory (ROM), or both. A storage device 1103 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 1103 may include source code, binary code, or software files for performing the techniques above, for example. Storage device and memory are both examples of computer readable mediums.

Computer system 1110 may be coupled via bus 1105 to a display 1112, such as a cathode ray tube (CRT) or liquid crystal display (LCD), for displaying information to a computer user. An input device 1111 such as a keyboard and/or mouse is coupled to bus 1105 for communicating information and command selections from the user to processor 1101. The combination of these components allows the user to communicate with the system. In some systems, bus 1105 may be divided into multiple specialized buses.

Computer system 1110 also includes a network interface 1104 coupled with bus 1105. Network interface 1104 may provide two-way data communication between computer system 1110 and the local network 1120. The network interface 1104 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 1104 sends and receives electrical, electromagnetic, or optical signals that carry digital data streams representing various types of information.

Computer system 1110 can send and receive information, including messages or other interface actions, through the network interface 1104 across a local network 1120, an Intranet, or the Internet 1130. For a local network, computer system 1110 may communicate with a plurality of other computer machines, such as server 1115. Accordingly, computer system 1110 and server computer systems represented by server 1115 may form a cloud computing network, which may be programmed with processes described herein. In the Internet example, software components or services may reside on multiple different computer systems 1110 or servers 1131-1135 across the network. The processes described above may be implemented on one or more servers, for example. A server 1131 may transmit actions or messages from one component, through Internet 1130, local network 1120, and network interface 1104 to a component on computer system 1110. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
   an engine of an in-memory database executing a user action with a Multi-Party Web Application (MPWA);
   the engine receiving a trace of HTTP traffic with the MPWA resulting from the user action, the HTTP traffic comprising part of a security protocol;
   the engine causing an element to be removed from the trace that results in the HTTP traffic ceasing and the security protocol not completing successfully;
   the engine assigning a semantic label to the trace comprising the element, to create a labeled trace indicated as mandatory;
   the engine applying an attack pattern to the labeled trace to identify an attack, wherein the attack pattern is stored in the in-memory database; and
   the engine reporting the attack to a user interface.

2. A method as in claim 1 wherein the engine is in communication with a tool to probe the MPWA.

3. A method as in claim 1 wherein the semantic label further identifies an element of the trace as unique to an application, a user, or a session.

4. A method as in claim 1 wherein assigning the label comprises assigning a flow label.

5. A method as in claim 4 wherein the flow label identifies a generator of the trace and a recipient of the trace.

6. A method as in claim 5 wherein the flow label indicates the generator as a trusted third party (TTP) and the recipient as a service provider (SP), or indicates the generator as the SP and the recipient as a TTP.

7. A method as in claim 5 wherein the flow label is based upon a location of the element in the trace.

8. A method as in claim 1 wherein the attack pattern comprises a structured artifact executable by the engine.

9. A non-transitory computer readable storage medium embodying a computer program for performing a method, said method comprising:
   an engine of an in-memory database executing a user action with a Multi-Party Web Application (MPWA);
   the engine receiving a trace of HTTP traffic with the MPWA resulting from the user action, the HTTP traffic comprising part of a security protocol;
   the engine causing an element to be removed from the trace that results in the HTTP traffic ceasing and the security protocol not completing successfully;
   the engine assigning a plurality of labels to the trace comprising the element, to create a labeled trace including a semantic label indicating the labeled trace as mandatory;
   the engine receiving an attack pattern comprising a structured artifact, the attack pattern stored in the in-memory database;
   the engine executing the structured artifact against the labeled trace to identify an attack; and
   the engine reporting the attack to a user interface.

10. A non-transitory computer readable storage medium as in claim 9 wherein the plurality of labels comprise a syntactic label and a flow label.

11. A non-transitory computer readable storage medium as in claim 10 wherein the semantic label identifies an element of the trace as unique to an application, a user, or a session.

12. A non-transitory computer readable storage medium as in claim 10 wherein the engine is in communication with a tool to probe the MPWA.

13. A non-transitory computer readable storage medium as in claim 10 wherein the flow label identifies a location of the element in the trace.

14. A non-transitory computer readable storage medium as in claim 10 wherein the structured artifact comprises a name, a goal, an input, and a condition.

15. A computer system comprising:
   one or more processors including an engine of an in-memory database;
   a memory coupled to the one or more processors and comprising a software program, executable on said computer system, the software program configured to cause the engine to:
   execute a user action with a Multi-Party Web Application (MPWA);
   receive a trace of HTTP traffic with the MPWA resulting from the user action, the HTTP traffic comprising part of a security protocol;
   cause an element to be removed from the trace that results in the HTTP traffic ceasing and the security protocol not completing successfully;

assign a syntactic label, a semantic label, and a flow label to the trace comprising the element, to create a labeled trace including a semantic label indicating the labeled trace as mandatory;

receive an attack pattern comprising a structured artifact, the attack pattern stored in the in-memory database;

execute the structured artifact against the labeled trace to identify an attack; and report the attack to a user interface.

16. A computer system as in claim 15 wherein the semantic label identifies an element of the trace as unique to an application, a user, or a session.

17. A computer system as in claim 15 wherein the engine is in communication with a tool to probe the MPWA.

18. A computer system as in claim 15 wherein the flow label indicates a generator of the trace as a trusted third party (TTP) and a recipient of the trace as a service provider (SP), or indicates the generator as the SP and the recipient as a TTP.

19. A computer system as in claim 15 wherein the flow label is based upon a location of an element in the trace.

* * * * *